United States Patent
Sorensen et al.

(10) Patent No.: US 6,372,171 B1
(45) Date of Patent: Apr. 16, 2002

(54) REPOSITIONING OF ARTICLES BETWEEN DIFFERENT POSITIONS WITHIN AN INTERMITTENTLY ACCESSIBLE SPACE

(75) Inventors: Jens Ole Sorensen, Cayman Kai (KY); Paul Philip Brown, Carlsbad, CA (US)

(73) Assignee: Universal Ventures (KY)

( * ) Notice: Subject to any disclaimer, the term of this patent is extended or adjusted under 35 U.S.C. 154(b) by 0 days.

(21) Appl. No.: 09/547,218

(22) Filed: Apr. 11, 2000

Related U.S. Application Data

(62) Division of application No. 08/914,569, filed on Aug. 19, 1997, now Pat. No. 6,086,808.

(51) Int. Cl.[7] .......................... B29C 33/12; B29C 33/44
(52) U.S. Cl. ...................... 264/278; 264/250; 425/438; 425/444
(58) Field of Search ................................. 264/250, 255, 264/277, 278, 334; 425/444, 456, 436 R, 438, 135, 139

(56) References Cited

U.S. PATENT DOCUMENTS

| | | |
|---|---|---|
| 3,947,208 A | 3/1976 | Broderick |
| 4,732,554 A | 3/1988 | Hellmann |
| 4,814,134 A | 3/1989 | Brown |
| 4,915,611 A | 4/1990 | Brown |
| 4,990,299 A | 2/1991 | Sorensen |
| 5,049,343 A | 9/1991 | Sorensen |
| 5,234,328 A | 8/1993 | Willson et al. |
| 5,753,151 A | 5/1998 | McBride |
| 5,756,029 A | 5/1998 | Nakamichi et al. |

FOREIGN PATENT DOCUMENTS

| | | |
|---|---|---|
| EP | 0 504 571 | 9/1992 |
| EP | 0 914 921 | 5/1999 |

OTHER PUBLICATIONS

Patent Abstracts of Japan vol. 010, No. 181 (M–492), Jun. 25, 1986 & JP 61 029516 A (Nissei Plastics Ind Co), Feb. 10, 1986.

Patent Abstracts of Japan vol. 017, No. 106 (M–1375), Mar. 4, 1993 & JP 04 296520 A (Mitsubishi Heavy Ind Ltd), Oct. 20, 1992.

Patent Abstract of Japan vol. 012, No. 208 (M–709), Jun. 15, 1988 & JP 63 011317 A (Sekisui Chem Co Ltd), Jan. 18, 1988.

*Primary Examiner*—Angela Ortiz
(74) *Attorney, Agent, or Firm*—Edward W. Callan

(57) ABSTRACT

Articles, such as components of an injection-molded multi-component product, are repositioned within a space, such as the space between mold parts, that is accessible for repositioning only during a series of periods, such as open-mold periods, that are separated by intervals of less accessibility for repositioning, such as closed-mold intervals by (a) moving a first article, such as a first component of a first multi-component product, from a first position within the space to outside of the space during a first such period; and (b) moving a second identical article, such as a first component of a second multi-component, from outside of the space to a second position within the space during the first such period. Both the movement of the first article and the movement of the second article are by means of a common vehicle, such as a common robot arm. In another aspect, an article is repositioned by (a) moving the article from a first position within the space to outside of the space during a first such period; and (b) during a second such period after an interval of less accessibility that is subsequent to the first period, moving the article from outside of the space to a second position within the space.

36 Claims, 15 Drawing Sheets

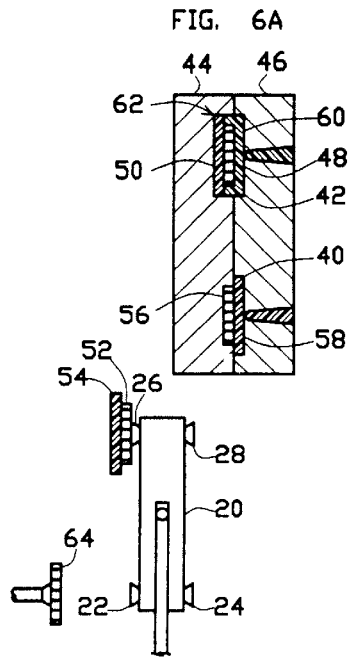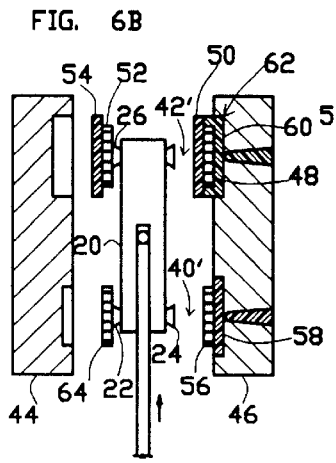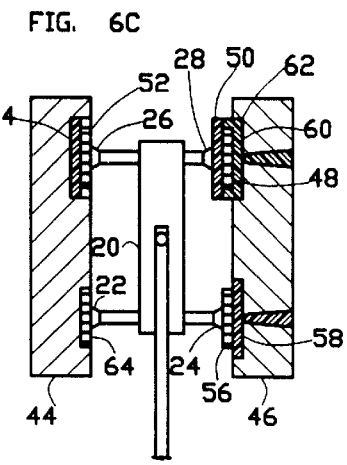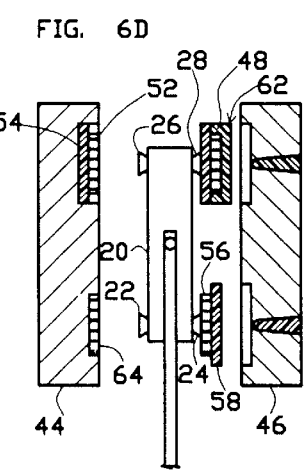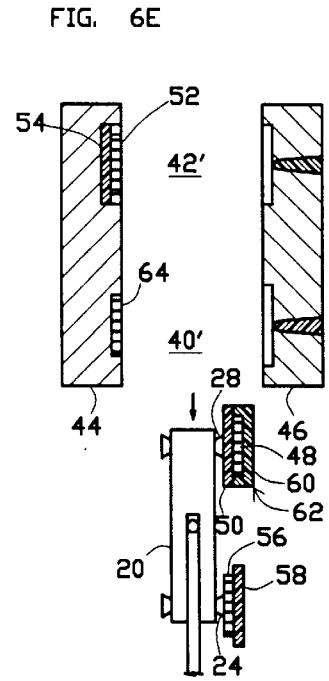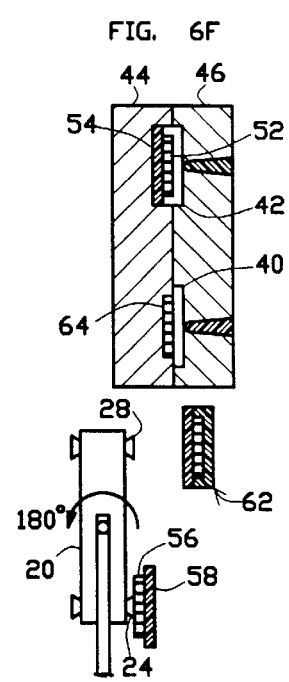

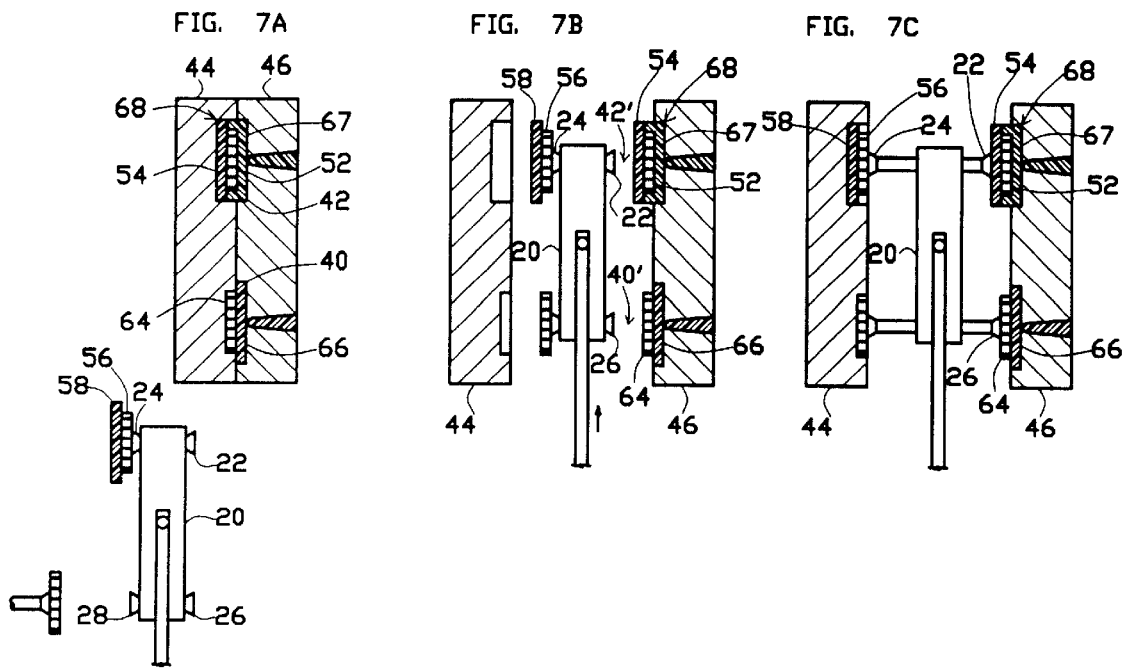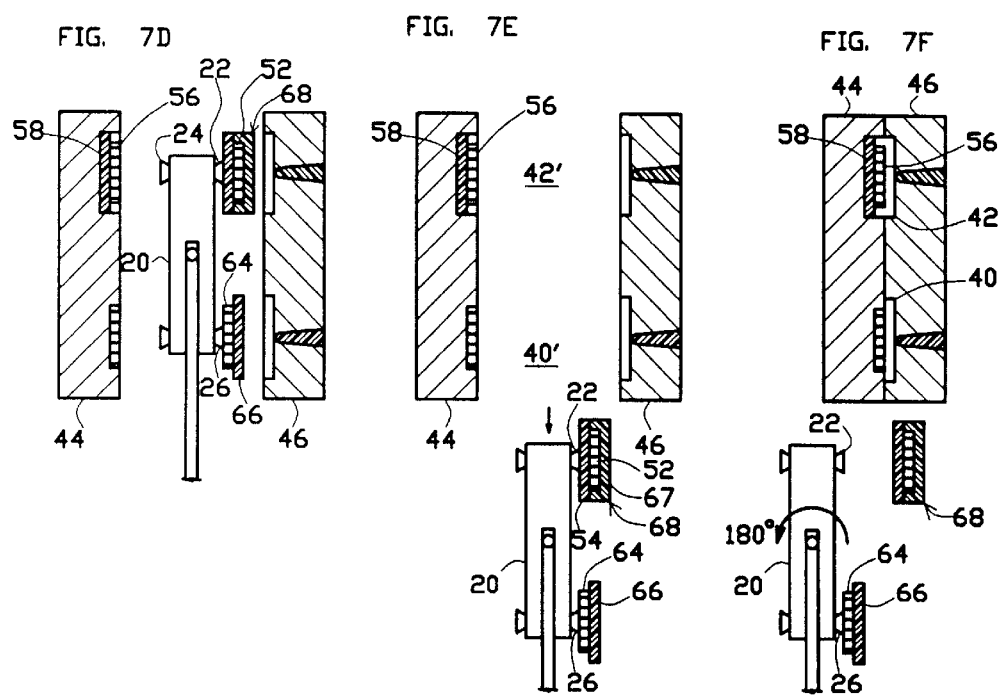

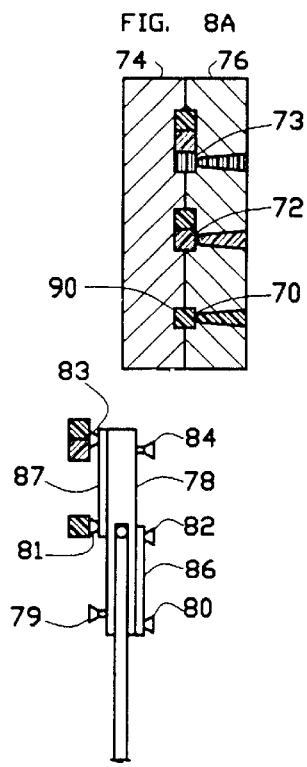
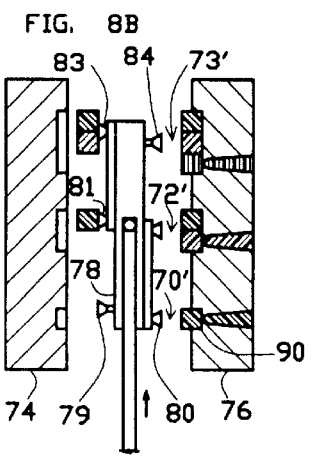
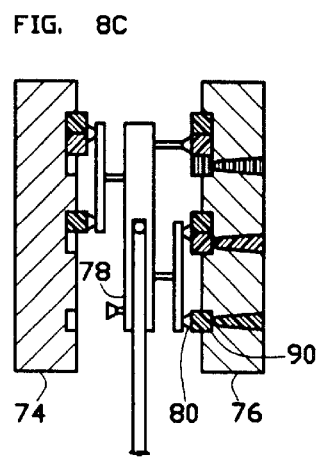
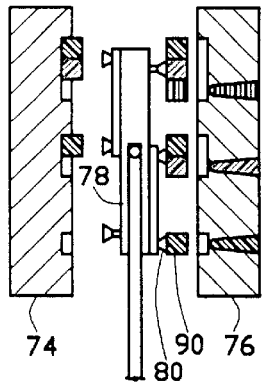
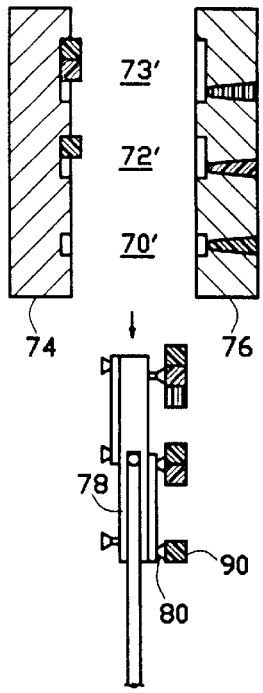
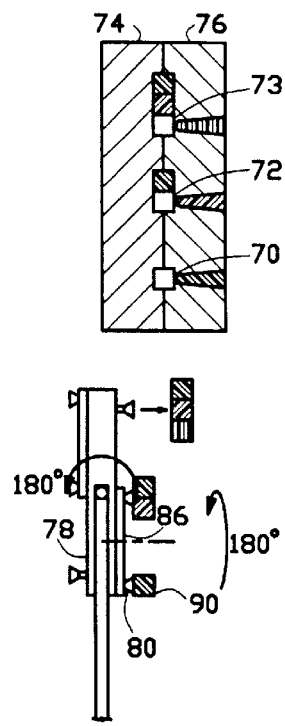

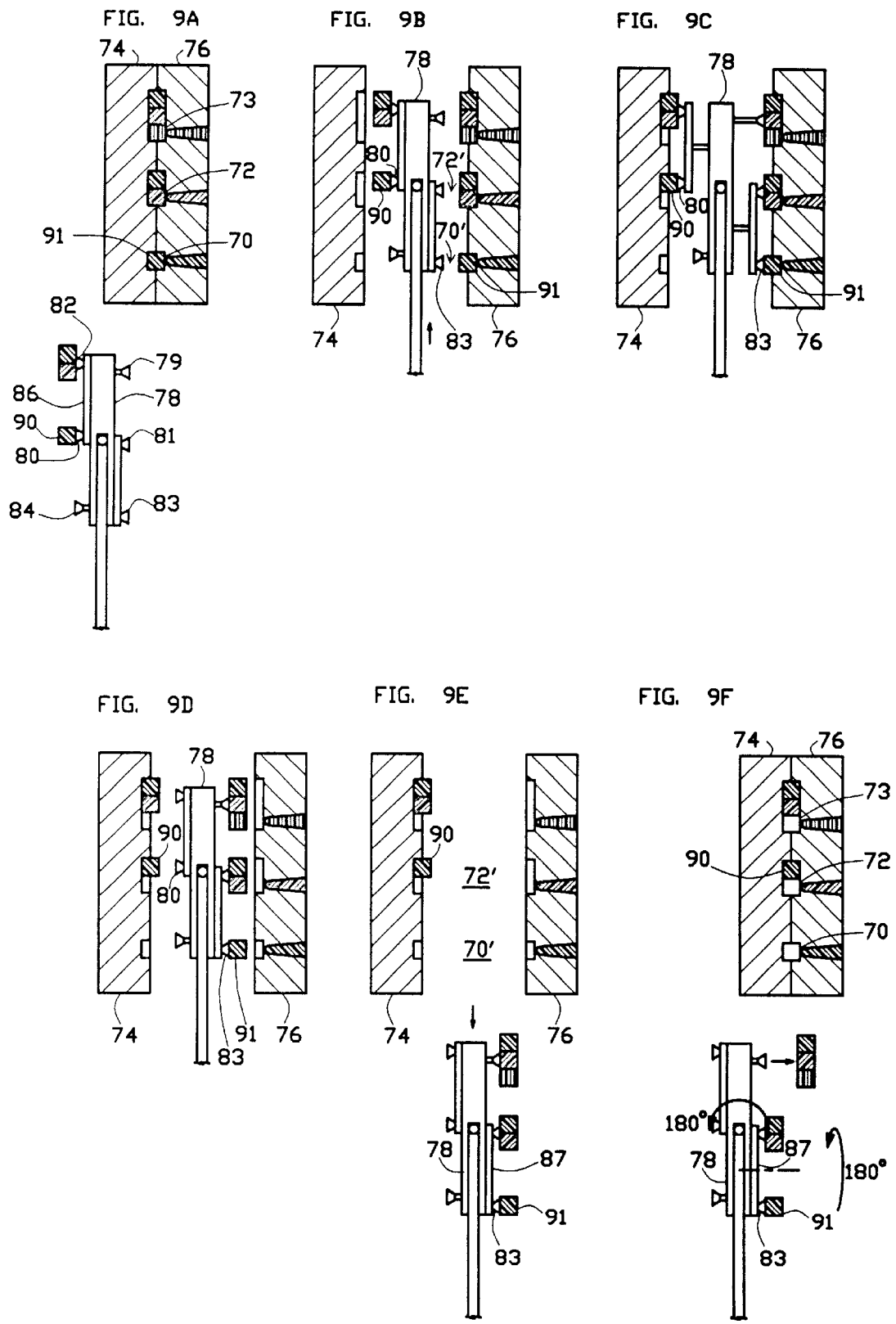

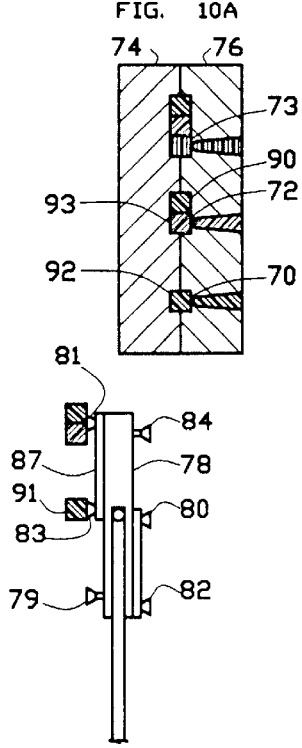
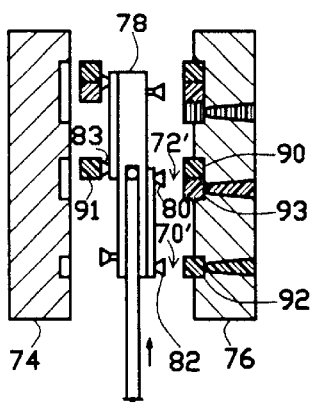
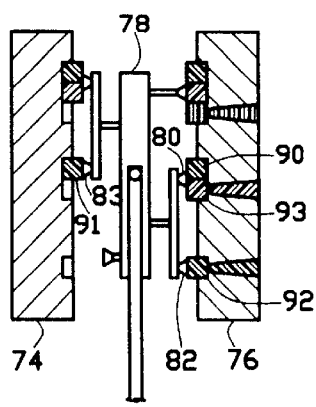
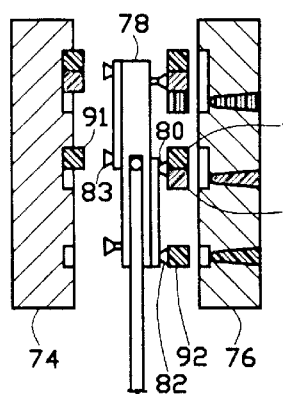
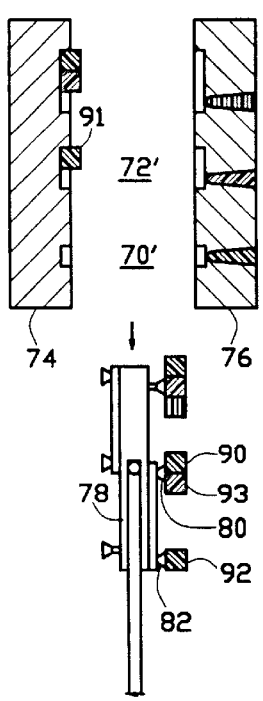
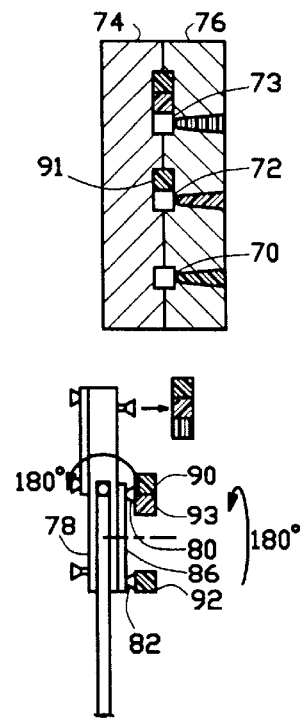

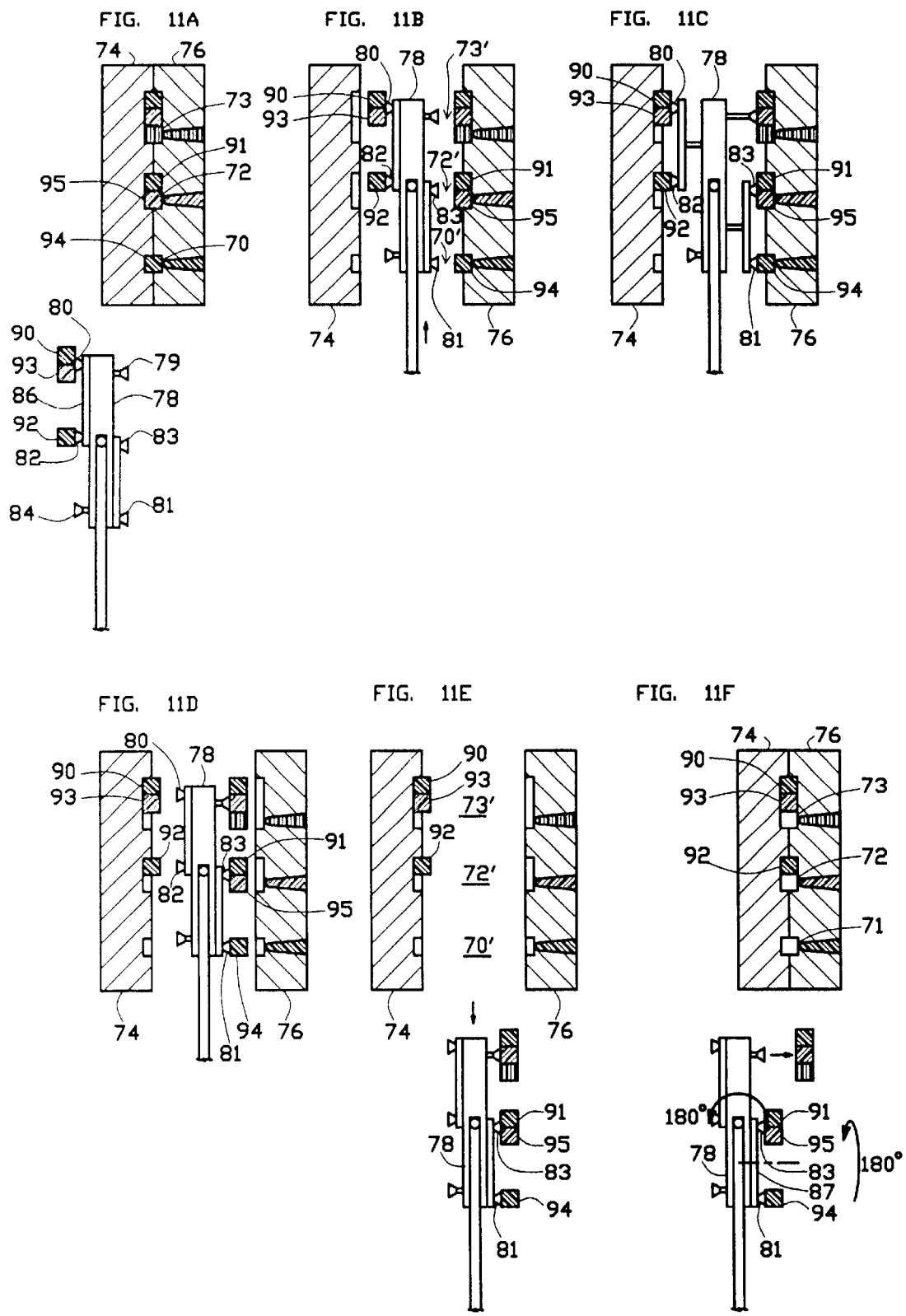

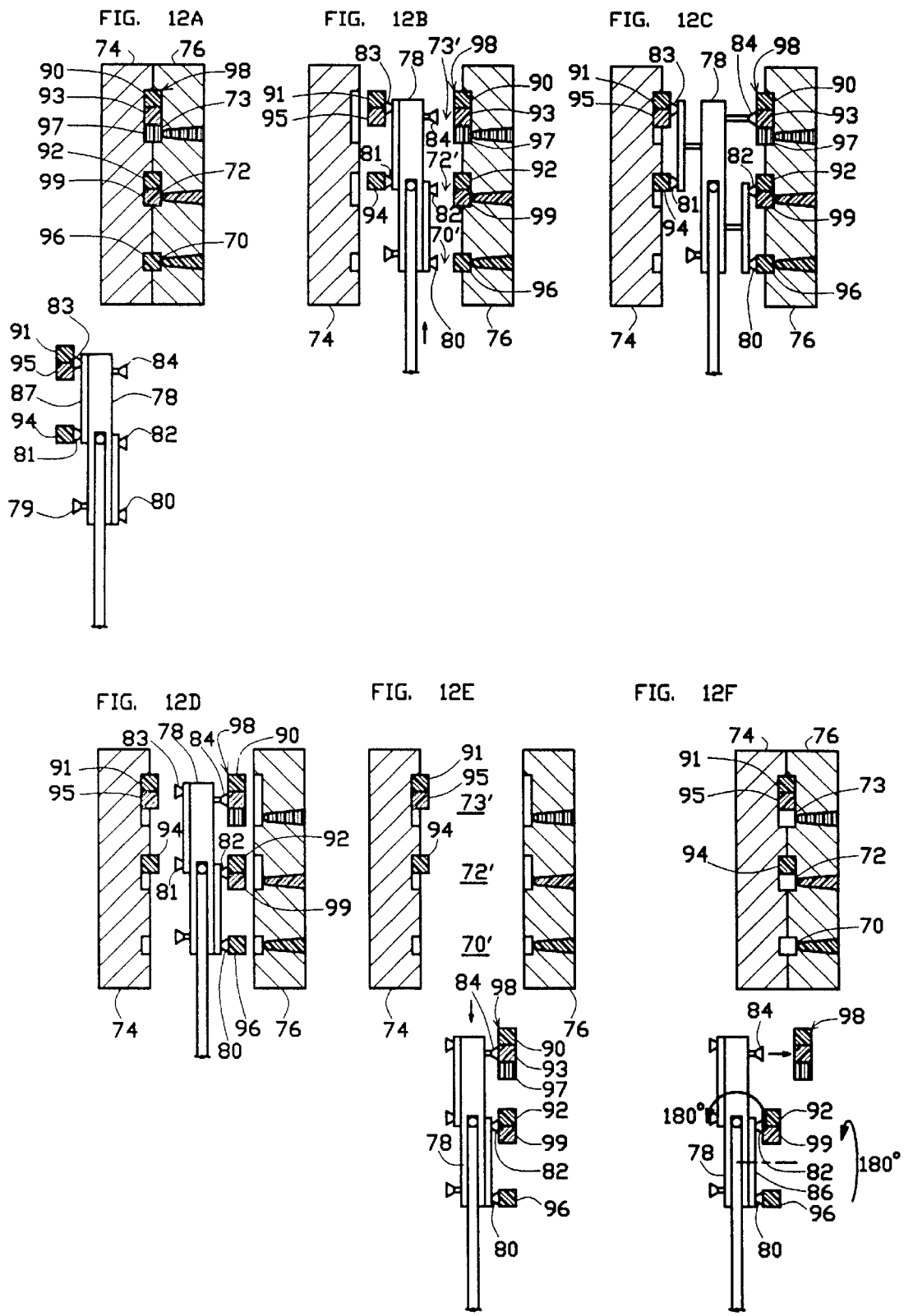

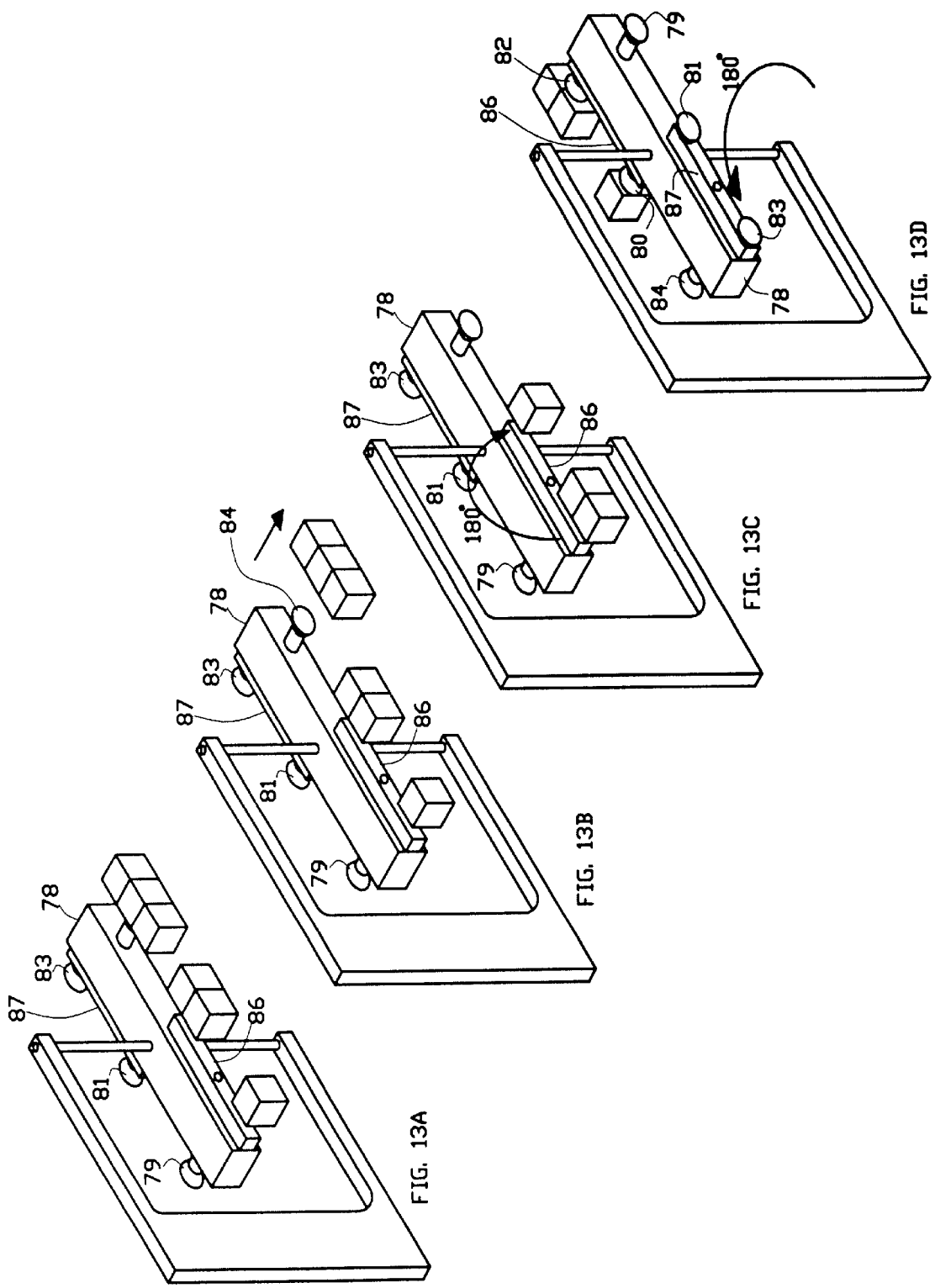

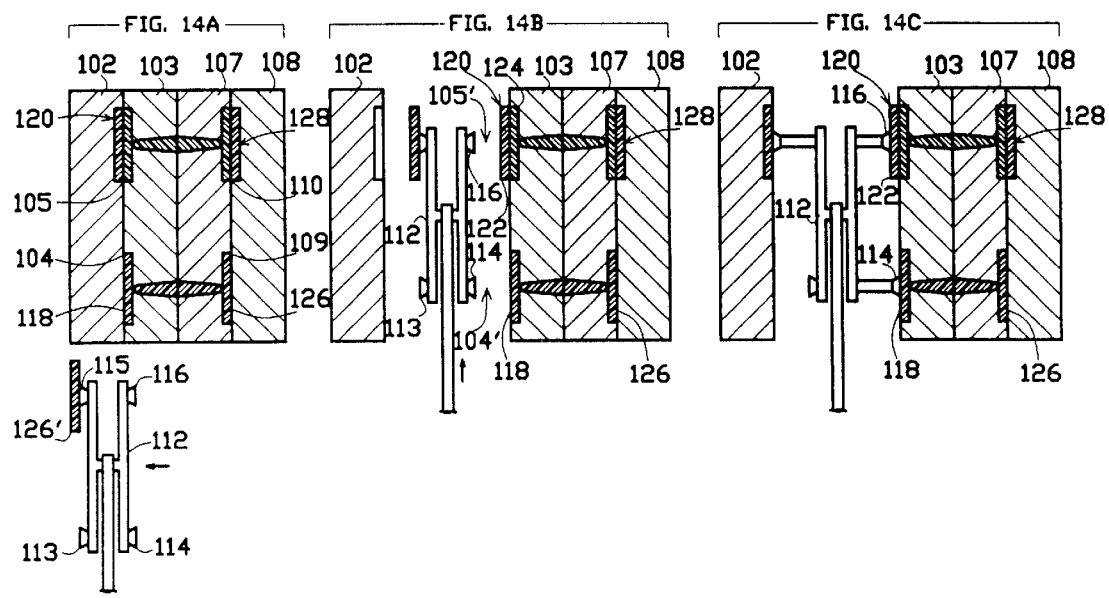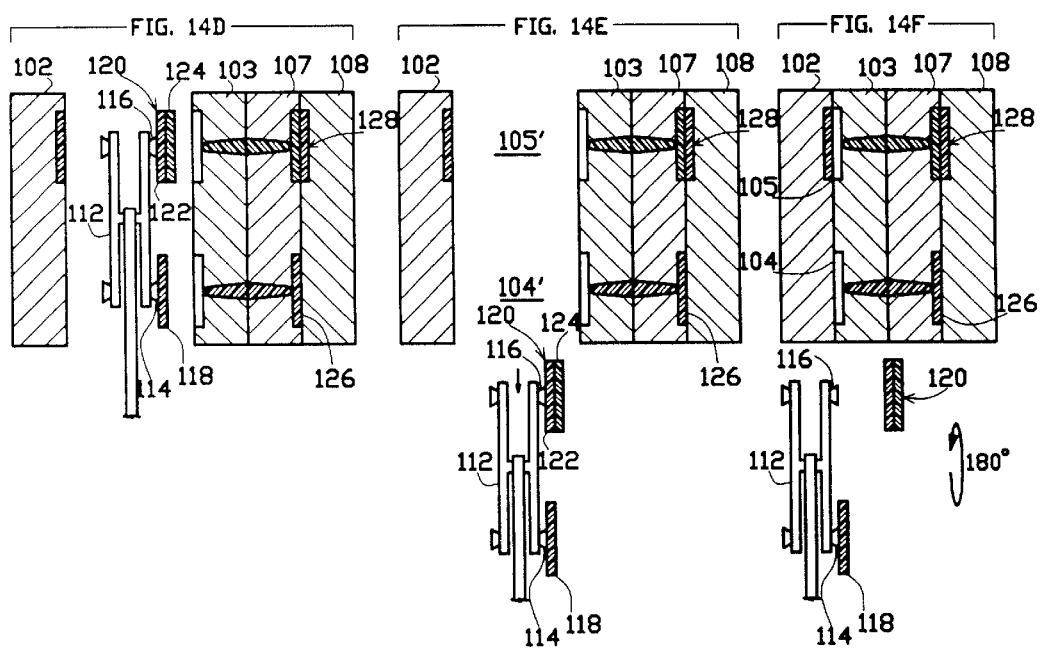

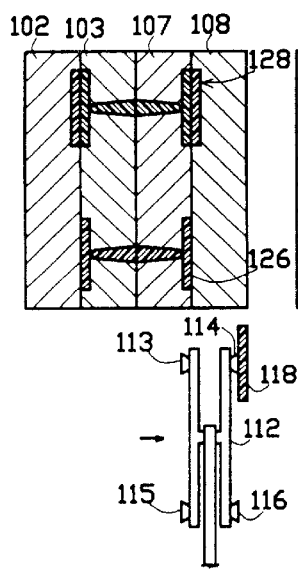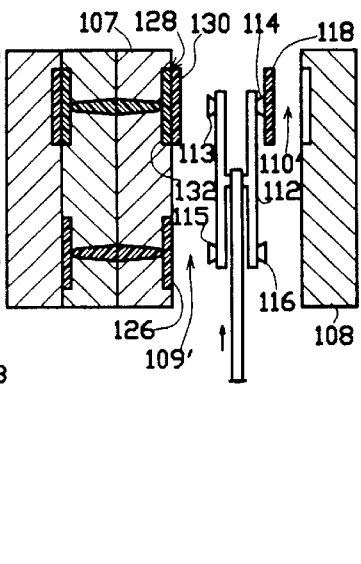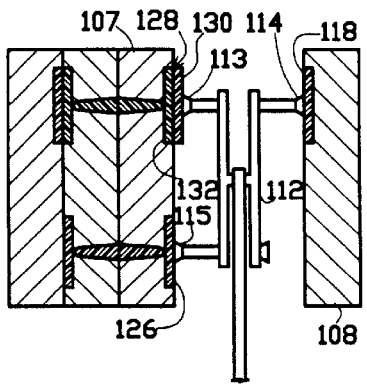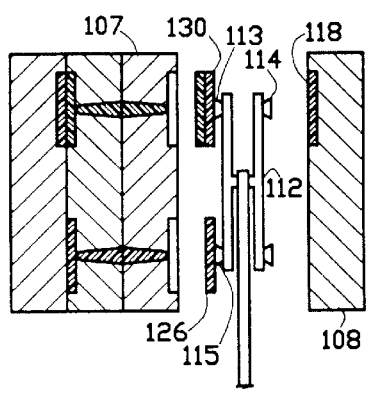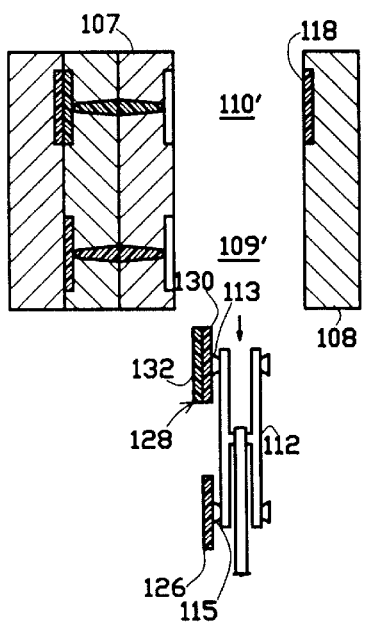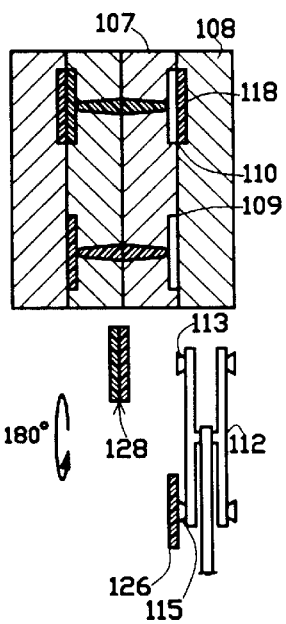

REPOSITIONING OF ARTICLES BETWEEN DIFFERENT POSITIONS WITHIN AN INTERMITTENTLY ACCESSIBLE SPACE

CROSS-REFERENCE TO RELATED APPLICATION

This is a division of application No. 08/914,569 filed Aug. 19, 1997 now U.S. Pat. No. 6,086,808.

BACKGROUND OF THE INVENTION

The present invention pertains to repositioning articles within a space that is accessible for said repositioning only during a series of periods that are separated by intervals of less accessibility for said repositioning than during said periods.

For various manufacturing and other processes it is desirable to reposition an article within a given space between processing steps. When an article has to be moved from a first processing position within the given space to a second processing position within the given space, but such movement is impeded or made impossible by changes in the accessibility of the given space for said repositioning that are necessitated by one or more aspects of the process, such repositioning typically is carried out during those periods when the given space is more accessible for said repositioning but not during those intervals when the given space is less accessible for repositioning. As a result, such accessible periods may be of such an extended duration as to slow down or halt the overall process and thereby make the overall process less efficient.

For example, in a process for injection molding a multi-component product a first component formed in a first mold cavity by injection molding is repositioned to a second mold cavity in which a second component of the product is formed in combination with the first component by injection molding the second component. Such repositioning within the space between the mold parts can be accomplished only during a period of time when the mold is open, and typically is accomplished by means of a robot arm that (a) attaches onto the first component in the first mold-cavity position with an attachment mechanism on the robot arm, (b) moves the attached first component from the first mold-cavity position to a second mold-cavity position and (c) releases the first component from the attachment mechanism. However, the time required for attaching onto the first component, moving the attached first component from the first mold-cavity position to the second mold-cavity position and releasing the first component is greater than the time required for merely attaching onto a molded article and moving the attached molded article from its mold-cavity position when repositioning of the molded article is not required, whereby such repositioning from the first mold-cavity position to the second mold-cavity position within the space between the mold parts makes it necessary to keep the mold open for a longer period of the time so that the space between the mold parts will be accessible until said repositioning is completed.

SUMMARY OF THE INVENTION

In one aspect, the present invention provides a method of repositioning articles within a space that is accessible for said repositioning only during a series of periods that are separated by intervals of less accessibility for said repositioning, comprising the steps of:
(a) during a first said period, moving a first article from a first position within said space to outside of said space; and
(b) during the first period, moving a second article from outside of said space to a second position within said space;
wherein said movement of the first article and said movement of the second article are by means of a common vehicle.

By using the same means, such as a common vehicle, to move the second article from outside of said space to the second position and then move the first article from the first position within said space to outside of said space during the same period of accessibility, the combined time required for repositioning both articles is reduced significantly and a separate repositioning step that would be required if both the movement of the second article to the second position and the movement of the first article from the second position were not accomplished by same means is eliminated.

In another aspect, the present invention provides a method of repositioning articles within a space that is accessible for said repositioning only during a series of periods that are separated by intervals of less accessibility for said repositioning, comprising the steps of:
(a) during a first said period, moving a first article from a first position within said space to outside of said space; and
(b) during the first period, moving an identical second article from outside of said space to a second position within said space.

In a further aspect, the present invention provides a method of repositioning articles within a space that is accessible for said repositioning only during a series of periods that are separated by intervals of less accessibility for said repositioning than during said periods, comprising the steps of:
(a) during a first said period, moving a first article from a first position within said space to outside of said space; and
(b) during a second said period after a said interval of less accessibility that is subsequent to the first period, moving the first article from outside of said space to a second position within said space.

Accordingly, the repositioning method of the present invention does not require that the space be accessible for a period of time greater than the time required for attaching onto a first article and moving the attached first article from the first position within said space, whereby such repositioning method decreases the time during which the space must be accessible for said repositioning in relation to the accessible time required in the prior art repositioning method described above. Preferably, the first period is separated from the second period by only one interval of less accessibility.

The repositioning methods of the present invention are particularly applicable for repositioning articles within a space between mold parts that defme a plurality of mold cavities when the mold is closed, wherein said space is accessible for said repositioning only during a series of open-mold periods that are separated by closed-mold intervals of inaccessibility for said repositioning.

Additional features of the present invention are described with reference to the detailed description of the preferred embodiments.

BRIEF DESCRIPTION OF THE DRAWING

FIGS. 6A through 6F schematically illustrate a further subsequent series of steps in the injection molding process in which articles are repositioned in accordance with the second embodiment during a third period of accessibility.

FIGS. 7A through 7F schematically illustrate a still further subsequent series of steps in the injection molding process in which articles are repositioned in accordance with the second embodiment during a fourth period of accessibility.

FIGS. 8A through 8F schematically illustrate a series of steps in an injection molding process in which articles are repositioned in accordance with a third embodiment of the method of the present invention during a first period of accessibility.

FIGS. 9A through 9F schematically illustrate a subsequent series of steps in the injection molding process in which articles are repositioned in accordance with the third embodiment during a second period of accessibility.

FIGS. 10A through 10F schematically illustrate a further subsequent series of steps in the injection molding process in which articles are repositioned in accordance with the third embodiment during a third period of accessibility.

FIGS. 11A through 11F schematically illustrate a still further subsequent series of steps in the injection molding process in which articles are repositioned in accordance with the third embodiment during a fourth period of accessibility.

FIGS. 12A through 12F schematically illustrate yet another subsequent series of steps in the injection molding process in which articles are repositioned in accordance with the third embodiment during a fifth period of accessibility.

FIGS. 13A through 13D schematically illustrate the operation of a robot mechanism when the articles attached thereto have been removed from the space between the mold parts in accordance with the third embodiment, as shown in view F of FIGS. 8 through 12.

FIGS. 14A through 14L schematically illustrate a series of steps in an injection molding process in which articles are repositioned within spaces between different pairs of separated mold parts of a stack mold in accordance with a fourth embodiment of the method of the present invention during a first open-mold period of accessibility to the space between one pair of mold parts, as shown in FIGS. 14A through 14F, and during a second open-mold period of accessibility to the space between another pair of mold parts, as shown in FIGS. 14G through 14L.

DETAILED DESCRIPTION

Figure 1A:
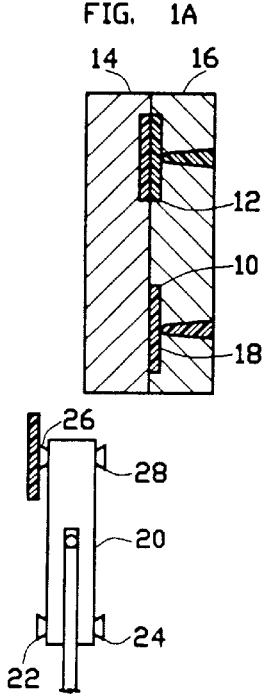
FIGS. 1A through 1F schematically illustrate a series of steps in an injection molding process in which articles are repositioned in accordance with a first embodiment of the method of the present invention during a first period of accessibility.

Referring to FIGS. 1A through 1F, 2A through 2F and 3A through 3F, a first embodiment of the repositioning method of the present invention is performed during an injection molding process in which a multi-component product is produced by injection molding a first component of the product in a first mold cavity 10 and repositioning the first component to a second mold cavity 12 in which a second component of the product is formed in combination with the first component by injection molding the second component. The first component of the product is referred to the following description of this first embodiment as an "article". The first mold cavity 10 and the second mold cavity 12 are defined between a first mold part 14 and a second mold part 16 during the closed-mold intervals of inaccessibility for repositioning of the articles while the mold is closed, as shown in views A and F of FIGS. 1, 2 and 3. A space between the first and second mold parts 14, 16 for repositioning of the articles is accessible only during open-mold periods while the mold is opened by separation of the first and second mold parts 14, 16, as shown in views B through E of FIGS. 1, 2 and 3.

A first article 18 is formed in the first mold cavity 10 by injection molding during a first closed-mold interval, as shown in FIG. 1A. After, the injection-molded first article 18 has cooled sufficiently, the first and second mold parts 14, 16 are separated to open the mold. When the first and second mold parts 14, 16 are separated the first article 18 is retained in the first-mold-cavity-defining portion of the second mold part 16, as shown in FIG. 1B.

Figure 1B:
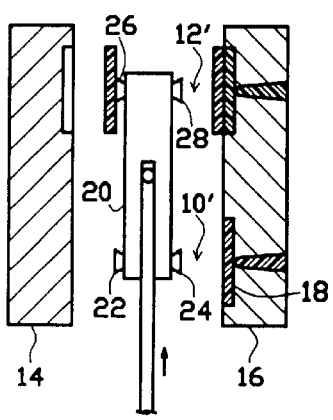

At the beginning of a first open-mold period after the first closed-mold interval, as shown in FIG. 1B, a common robot arm 20 is moved into the space between the separated first and second mold parts 14, 16. The robot arm 20 includes first, second, third and fourth extendable attachment mechanisms 22, 24, 26 and 28 that are so positioned on the robot arm 20 that when the robot arm 20 is moved from outside of the space between the separated first and second mold parts 14, 16 to a predetermined depth of penetration between the mold parts 14, 16, as shown in FIG. 1B, the first and second attachment mechanisms 22, 24 are disposed at a first mold-cavity position 10' adjacent those portions of the separated first and second mold parts 14, 16 that define the first mold cavity 10 when the mold is closed, and the third and fourth second attachment mechanisms 26, 28 are disposed at a second mold-cavity position 12' adjacent those portions of the separated first and second mold parts 14, 16 that define the second mold cavity 12 when the mold is closed.

Figure 1C:
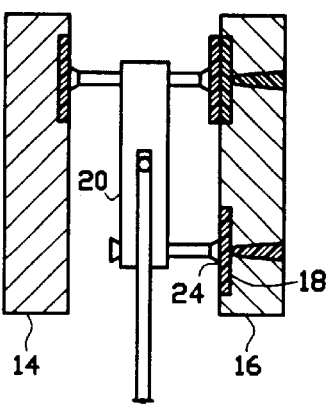

After the robot arm 20 is moved to the predetermined depth of penetration into the space between the separated first and second mold parts 14, 16, the second attachment mechanism 24 is extended to attach onto the first article 18, as shown in FIG. 1C.

Figure 1D:
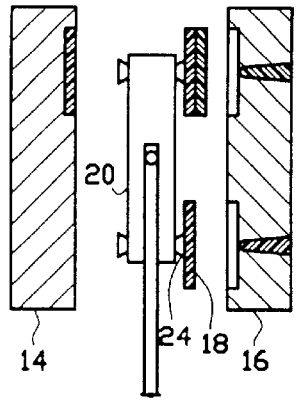

The second attachment mechanism 24 is then retracted to withdraw the attached first article 18 from the second mold part 16, as shown in FIG. 1D.

Figure 1E:
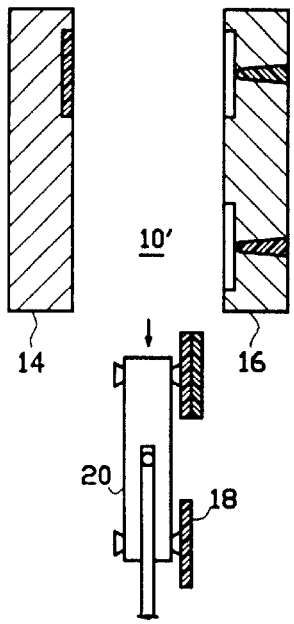

The robot arm 20 is then moved from the space between the separated first and second mold parts 14, 16 to move the attached first article 18 from the first position 10' to outside of the space between the separated first and second mold parts 14, 16, as shown in FIG. 1E.

Figure 1F:
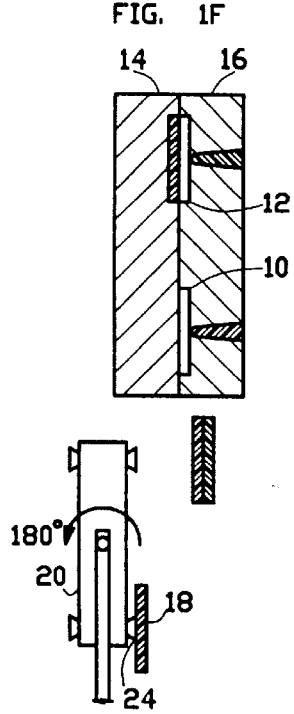
Figure 2A:
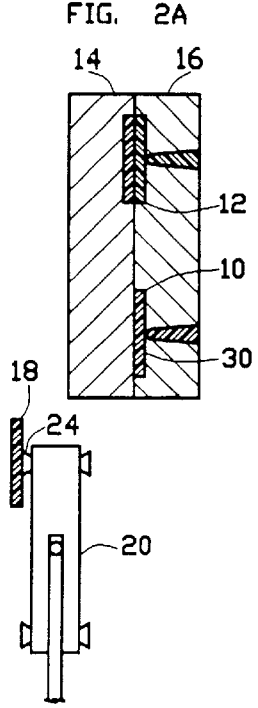
FIGS. 2A through 2F schematically illustrate a subsequent series of steps in the injection molding process in which articles are repositioned in accordance with the first embodiment during a second period of accessibility.

The mold is then closed, as shown in FIG. 1F, to commence a second closed-mold interval of inaccessibility; whereupon the robot arm 20 is rotated 180 degrees so that the first article 18 attached to the second attachment mechanism 24 of the robot arm 20 assumes the position shown in FIG. 2A.

During the second closed-mold interval, as further shown in FIG. 2A, a second article 30 is formed in the first mold cavity 10 by injection molding. After, the injection-molded second article 30 has cooled sufficiently, the first and second mold parts 14, 16 are separated to open the mold. When the first and second mold parts 14, 16 are separated the second article 30 is retained in the first-mold-cavity-defining portion of the second mold part 16, as shown in FIG. 2B.

Figure 2B:
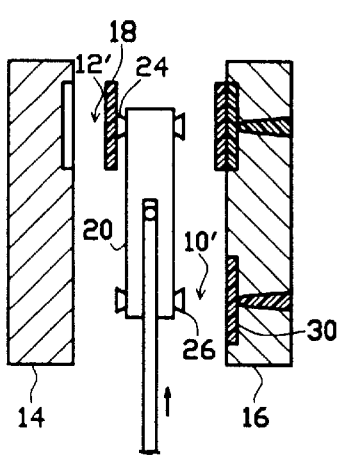

At the beginning of a second open-mold period after the second closed-mold interval, as shown in FIG. 2B, the robot arm 20 is again moved to the predetermined depth of penetration into the space between the separated first and second mold parts 14, 16 to move the first article 18 attached to the second attachment mechanism 24 to the second mold-cavity position 12' and to move the third attachment mechanism 26 to the first mold-cavity position 10'. All of such movements are simultaneous.

Figure 2C:
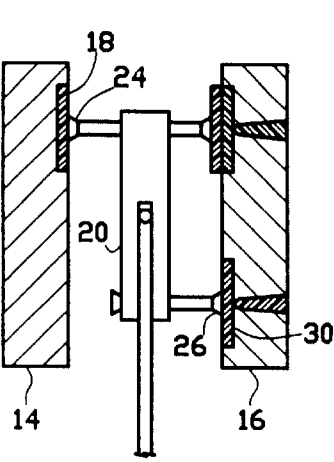

Next, the second attachment mechanism 24 is extended to place the first article 18 in the portion of the first mold part 14 that partially defines the second mold cavity 12; and the third attachment mechanism 26 is extended to attach onto the second article 30, as shown in FIG. 2C.

Figure 2D:
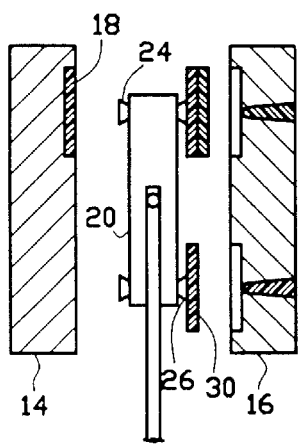

Next, the second attachment mechanism 24 releases the first article 18, which remains in the portion of the first mold part 14 that partially defines the second mold cavity 12 while the second attachment mechanism 24 is retracted; and the third attachment mechanism 26 is retracted to withdraw the attached second article 30 from the second mold part 16, as shown in FIG. 2D.

Figure 2E:
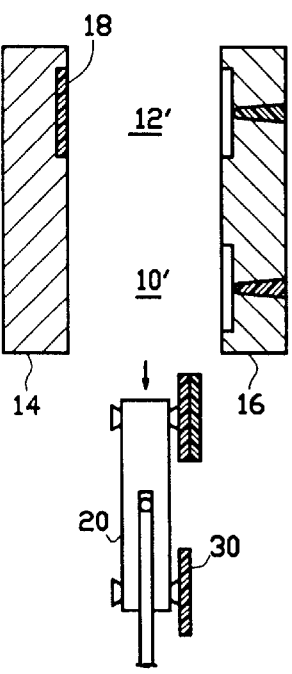

The robot arm 20 is then moved from the space between the separated first and second mold parts 14, 16 to move the attached second article 30 from the first position 10' to outside of the space between the separated first and second mold parts 14, 16, as shown in FIG. 2E.

Figure 2F:
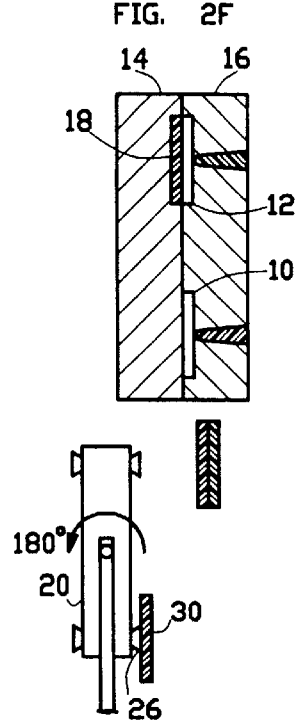
Figure 3A:
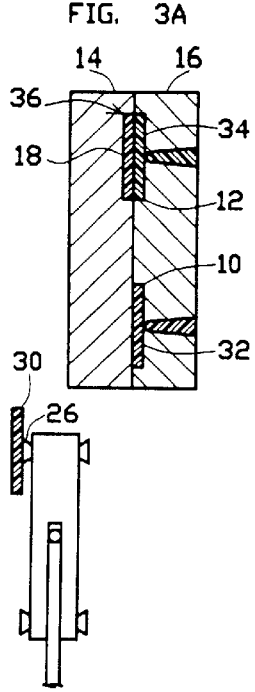
FIGS. 3A through 3F schematically illustrate a further subsequent series of steps in the injection molding process in which articles are repositioned in accordance with the first embodiment during a third period of accessibility.

The mold is then closed, as shown in FIG. 2F, to commence a third closed-mold interval of inaccessibility; whereupon the robot arm 20 is rotated 180 degrees so that the second article 30 attached to the third attachment mechanism 26 of the robot arm 20 assumes the position shown in FIG. 3A.

Referring to FIGS. 2B through 2E, the robot arm 20 moves with one continuous movement from outside of the space between the separated first and second mold parts 14, 16 to the predetermined depth of penetration in such space where the common robot arm 20 both releases the first article 18 at the second mold-cavity position 12' and attaches onto the second article 30 at the first mold cavity position 10'; and from the predetermined depth of penetration the common robot arm 20 moves with one continuous movement to outside of such space.

In an embodiment alternative to that shown in FIGS. 2B through 2E, the attachment mechanisms 22, 24, 26, 28 are not extended from the robot arm 20 in order to attach onto an article or in order to place an article in a cavity-defining portion of a mold part while the robot arm remains in a stationary lateral position, as described above, but instead the robot arm 20 is moved laterally toward and away from the respective separated first and second mold parts 14, 16 in order to enable the respective attachment mechanisms 22, 24, 26, 28 to attach onto an article or to place an article in a cavity-defining portion of a mold part.

During the third closed-mold interval, as further shown in FIG. 3A, a third article 32 is formed in the first mold cavity 10 by injection molding; and the first article 18 is combined with a second component 34 of a product 36 by forming the second component 36 in the second mold cavity 12 by injection molding. The first article 18, the second article 30 and the third article 32 are identical. After, the injection-molded third article 32 and the injection molded second component 34 of the product 36 have cooled sufficiently, the first and second mold parts 14, 16 are separated to open the mold. When the first and second mold parts 14, 16 are separated the third article 32 is retained in the first-mold-cavity-defining portion of the second mold part 16 and the product 36 is retained in the second-mold-cavity-defining portion of the second mold part 16, as shown in FIG. 3B.

Figure 3B:
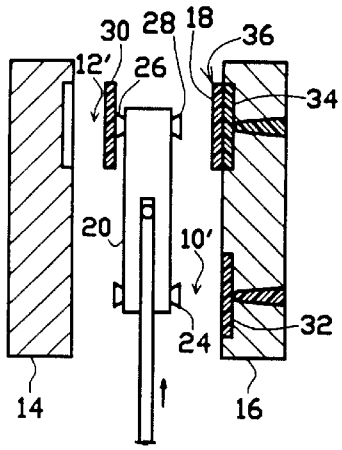

At the beginning of a third open-mold period after the second closed-mold interval, as shown in FIG. 3B, the robot arm 20 is again moved to the predetermined depth of penetration into the space between the separated first and second mold parts 14, 16 to move the second article 30 attached to the third attachment mechanism 26 to the second mold-cavity position 12', to move the second attachment mechanism 24 to the first mold-cavity position 10' and to move the fourth attachment mechanism 28 to the second mold cavity position 12'. All of such movements are simultaneous.

Figure 3C:
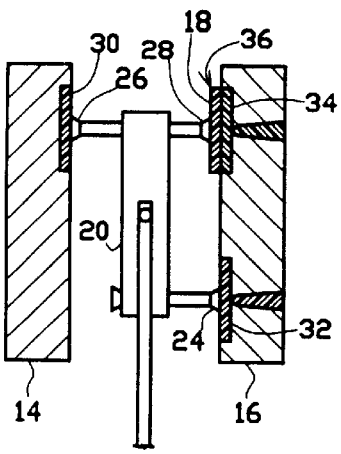

Next, the fourth attachment mechanism 28 is extended to attach onto the product 36 that includes the first article 18; the third attachment mechanism 26 is extended to place the second article 30 in the portion of the first mold part 14 that partially defines the second mold cavity 12; and the second attachment mechanism 24 is extended to attach onto the third article 32, as shown in FIG. 3C.

Figure 3D:
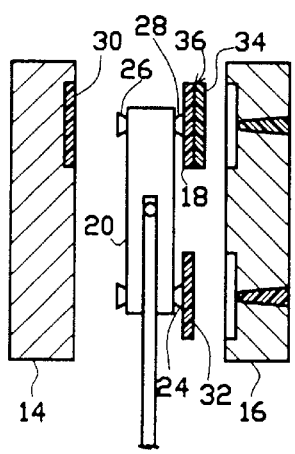

Next, the fourth attachment mechanism 28 is retracted to withdraw the attached product 36 that includes the first article 18 from the second mold part 16; the third attachment mechanism 26 releases the second article 30, which remains in the portion of the first mold part 14 that partially defines the second mold cavity 12 while the second attachment mechanism 24 is retracted; and the second attachment mechanism 24 is retracted to withdraw the attached third article 32 from the second mold part 16, as shown in FIG. 3D.

Figure 3E:
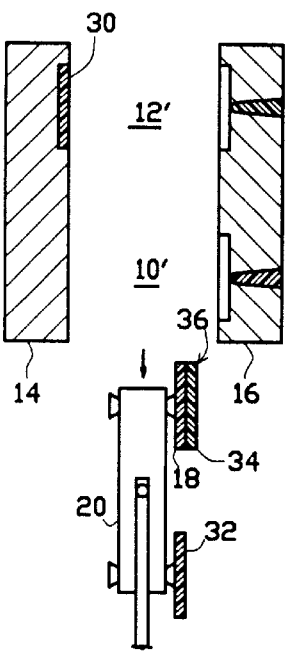

The robot arm 20 is then moved from the space between the separated first and second mold parts 14, 16 to simultaneously move both the attached product 36 that includes the first article 18 from the second position 12' and the attached third article 32 from the first position 10' to outside of the space between the separated first and second mold parts 14, 16, as shown in FIG. 3E.

Figure 3F:
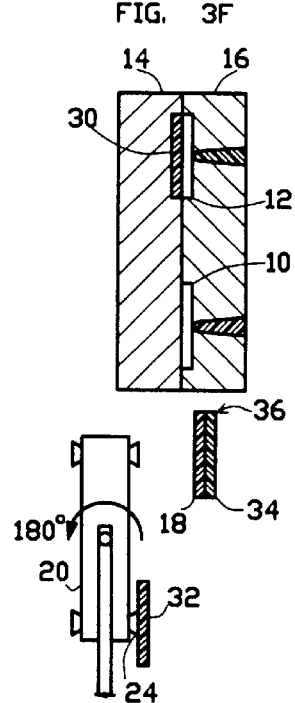

The mold is then closed, as shown in FIG. 3F, to commence a fourth closed-mold interval of inaccessibility; whereupon the fourth attachment mechanism 28 releases the product 36 and then the robot arm 20 is rotated 180 degrees so that the third article 32 attached to the second attachment mechanism 24 is reoriented for movement to the second mold-cavity position 12' within the space between the separated mold parts 14, 16 during a fourth period of accessibility following the third interval of inaccessibility. During the fourth period (not shown) the second article 30 is repositioned in the same manner as the first article 18 is repositioned during the third period, the third article 32 is repositioned in the same manner as the second article 30 is repositioned during the third period and a fourth article (not shown) is repositioned in the same manner as the third article 32 is repositioned during the third period.

Referring to FIGS. 4A through 4F, 5A through 5F, 6A through 6F and 7A through 7F, a second embodiment of the repositioning method of the present invention is performed during an injection molding process in which a multi-component product having an insert as its first component is produced by injection molding a second component of the product in a first mold cavity 40 containing the insert and repositioning the combined insert and injection-molded second component to a second mold cavity 42 in which a third component of the product is formed in combination with the insert and the second component by injection molding the third component. The insert is not necessarily formed by injection molding. The insert, or first component of the product, is referred to the following description of this second embodiment as an "article".

The first mold cavity 40 and the second mold cavity 42 are defined between a first mold part 44 and a second mold part 46 during closed-mold intervals of inaccessibility for repositioning of the articles while the mold is closed, as shown in views A and F of FIGS. 4, 5, 6 and 7. A space between the first and second mold parts 44, 46 for repositioning of the articles is accessible only during open-mold periods while the mold is opened by separation of the first and second mold parts 44, 46, as shown in views B through B of FIGS. 4, 5, 6 and 7. As in the first embodiment described above with reference to FIGS. 1A through 1F, 2A through 2F and 3A through 3F, a common robot arm 20 having four extendable attachment mechanisms 22 and 24, 26 and 28 is used to reposition the articles at a first mold-cavity position 40' adjacent those portions of the separated first and second mold parts 44, 46 that define the first mold cavity 40 when the mold is closed, and at a second mold-cavity position 42' adjacent those portions of the separated first and second mold parts 44, 46 that define the second mold cavity 42 when the mold is closed.

Figure 4A:
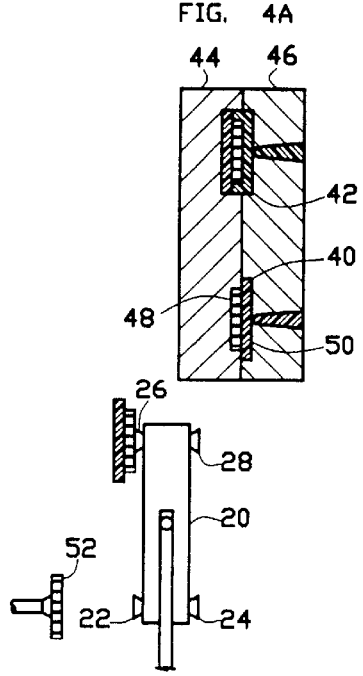
FIGS. 4A through 4F schematically illustrate a series of steps in an injection molding process in which articles are repositioned in accordance with a second embodiment of the method of the present invention during a first period of accessibility.

During a first closed-mold interval of inaccessibility, as shown in FIG. 4A, a first article 48 that was placed in the first mold cavity 40 during a previous period of accessibility is combined with a second component 50 of a product by forming the second component 50 in the first mold cavity 40 by injection molding and a second article 52 is attached to the first attachment mechanism 22 of the common robot arm 20. After the injection-molded second component 50 of the product that includes the first article 48 has cooled sufficiently, the first and second mold parts 44, 46 are separated to open the mold. When the first and second mold parts 44, 46 are separated, the second component 50 that is combined with the first article 48 is retained in the first-mold-cavity-defining portion of the second mold part 46, as shown in FIG. 4B.

Figure 4B:
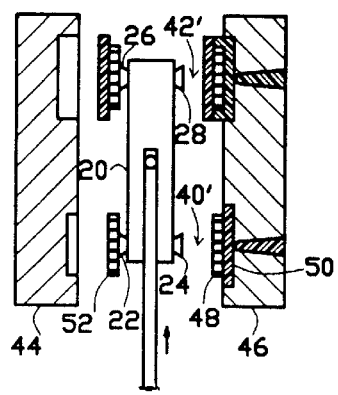

At the beginning of a first open-mold period after the first closed-mold interval, as shown in FIG. 4B, the common robot arm 20 is moved from outside of the space between the separated first and second mold parts 44, 46 to a predetermined depth of penetration into the space between the mold parts 44, 46 where the first and second attachment mechanisms 22, 24 are disposed at a first mold-cavity position 40' adjacent those portions of the separated first and second mold parts 44, 46 that define the first mold cavity 40 when the mold is closed, and the third and fourth second attachment mechanisms 26, 28 are disposed at a second mold-cavity position 42' adjacent those portions of the separated first and second mold parts 44, 46 that defme the second mold cavity 42 when the mold is closed.

Figure 4C:
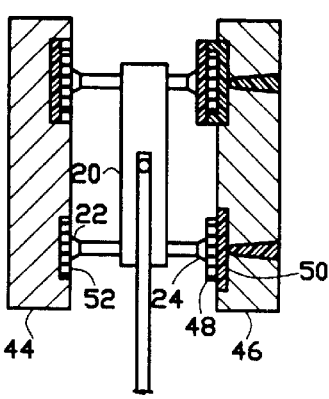

After the robot arm 20 is moved to the predetermined depth of penetration into the space between the separated first and second mold parts 44, 46, the first attachment mechanism 22 is extended to place the attached second article 52 article in the portion of the first mold part 44 that partially defines the first mold cavity 40; and the second attachment mechanism 24 is extended to attach onto the first article 48, as shown in FIG. 4C.

Figure 4D:
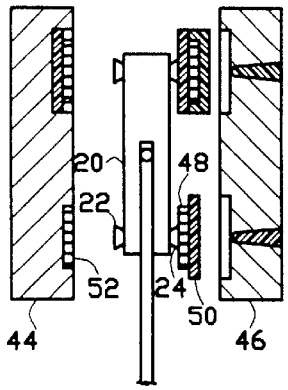

Next, the first attachment mechanism 22 releases the second article 52, which remains in the portion of the first mold part 44 that partially defines the first mold cavity 42 while the first attachment mechanism 22 is retracted; and the second attachment mechanism 24 is retracted to withdraw the attached first article 48 from the second mold part 46, as shown in FIG. 4D.

Figure 4E:
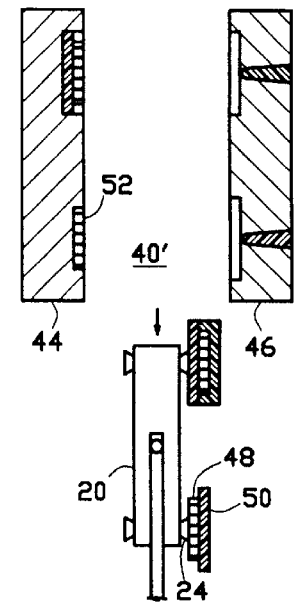

The robot arm 20 is then moved from the space between the separated first and second mold parts 44, 46 to move the attached first article 48 and the second component 50 combined therewith from the first position 40' to outside of the space between the separated first and second mold parts 44, 46, as shown in FIG. 4E.

Figure 4F:
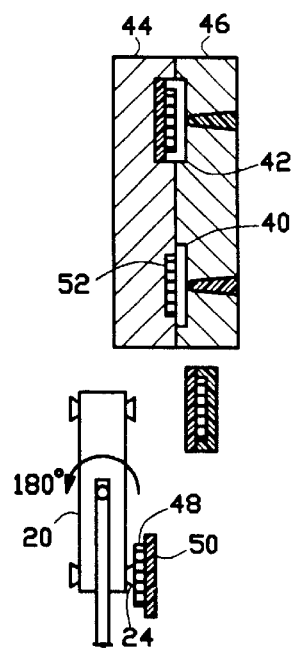
Figure 5A:
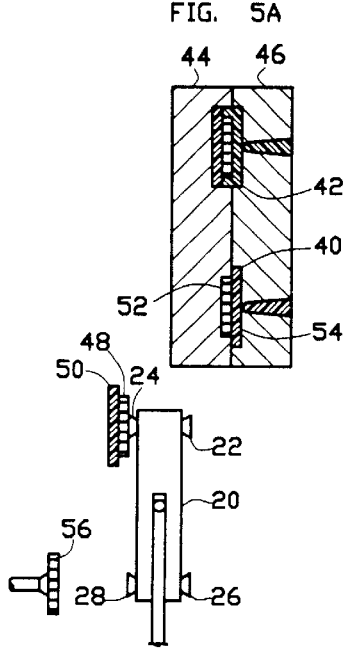
FIGS. 5A through 5F schematically illustrate a subsequent series of steps in the injection molding process in which articles are repositioned in accordance with the second embodiment during a second period of accessibility.

The mold is then closed, as shown in FIG. 4F, to commence a second closed-mold interval of inaccessibility; whereupon the robot arm 20 is rotated 180 degrees so that the first article 48 attached to the second attachment mechanism 24 of the robot arm 20 assumes the position shown in FIG. 5A.

During the second closed-mold interval, as further shown in FIG. 5A, a second component 54 of another product of which the second article 52 is the first component, is formed in the first mold cavity 40 by injection molding and a third article 56 is attached to the fourth attachment mechanism 28 of the common robot arm 20. After, the injection-molded second component 54 of the product that includes the second article 52 has cooled sufficiently, the first and second mold parts 44, 46 are separated to open the mold. When the first and second mold parts 44, 46 are separated the second component 54 that is combined with the second article 52 is retained in the first-mold-cavity-defining portion of the second mold part 46, as shown in FIG. 5B.

Figure 5B:
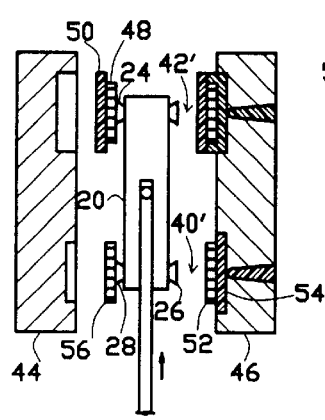

At the beginning of a second open-mold period after the second closed-mold interval, as shown in FIG. 5B, the robot arm 20 is again moved to the predetermined depth of penetration into the space between the separated first and second mold parts 44, 46 to move the first article 48 attached to the second attachment mechanism 24 to the second mold-cavity position 42', to move the third article 56 attached to the fourth attachment mechanism 28 to the first mold-cavity position 40' and to move the third attachment mechanism 26 to the first mold-cavity position 40'. All of such movements are simultaneous.

Figure 5C:
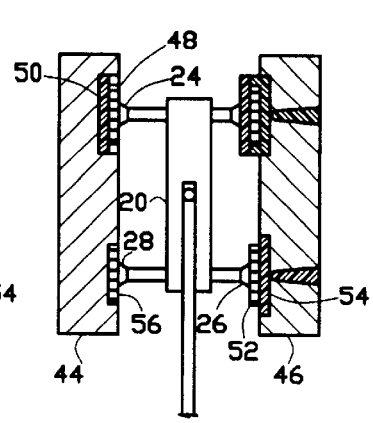

Next, the second attachment mechanism 24 is extended to place the attached first article 48 and the second component 50 combined therewith in the portion of the first mold part 44 that partially defines the second mold cavity 42, the third attachment mechanism 26 is extended to attach onto the second article 52 having the second component 54 combined therewith; and the fourth attachment mechanism 28 is extended to place the attached third article 56 in the portion of the first mold part 44 that partially defines the first mold cavity 40, as shown in FIG. 5C.

Figure 5D:
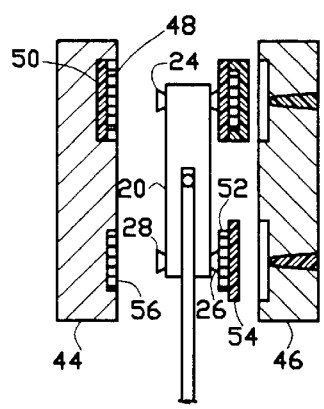

Next, the second attachment mechanism 24 releases the first article 48 and the second component 50 combined therewith, which remain in the portion of the first mold part 44 that partially defines the second mold cavity 42 while the second attachment mechanism 24 is retracted; the third attachment mechanism 26 is retracted to withdraw the attached second article 52 and the second component 56 combined therewith from the second mold part 46; and the fourth attachment mechanism 28 releases the third article 56, which remains in the portion of the first mold part 44 that partially defines the first mold cavity 40 while the fourth attachment mechanism 28 is retracted, as shown in FIG. 5D.

Figure 5E:
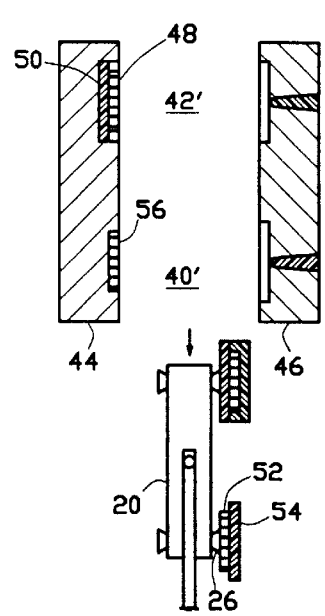

The robot arm 20 is then moved from the space between the separated first and second mold parts 44, 46 to move the attached second article 52 having the second component 54 combined therewith from the first position 10' to outside of the space between the separated first and second mold parts 44, 46, a s shown in FIG. 5E.

Figure 5F:
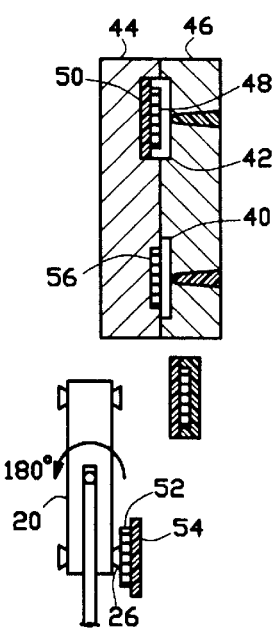

The mold is then closed, as shown in FIG. 5F, to commence a third closed-mold interval of inaccessibility; whereupon the robot arm 20 is rotated 180 degrees so that the second article 52 attached to the third attachment mechanism 26 of the robot arm 20 assumes the position shown in FIG. 6A.

Referring to FIGS. 5B through 5E, the robot arm 20 moves with one continuous movement from outside of the space between the separated first and second mold parts 44, 46 to the predetermined depth of penetration in such space where the common robot arm 20 both releases the first article 48 at the second mold-cavity position 42' and attaches onto the second article 52 at the first mold cavity position 40'; and from the predetermined depth of penetration the common robot arm 20 moves with one continuous movement to outside of such space.

During the third closed-mold interval, as further shown in FIG. 6A, a second component 58 of still another product of which the third article 56 is the first component, is formed in the first mold cavity 40 by injection molding; a third component 60 of a product 62, of which the first article 48 is the first component, is formed in the second mold cavity 42 by injection molding; and a fourth article 64 is attached to the first attachment mechanism 22 of the common robot arm 20. The first article 48, the second article 48, the third article 56 and the fourth article 64 are identical. After, the injection-molded third component 60 of the product 62 that includes the first article 48 and the second component 58 of the product that includes the third article 56 have cooled sufficiently, the first and second mold parts 44, 46 are separated to open the mold. When the first and second mold parts 44, 46 are separated, the second component 58 that is combined with the third article 56 is retained in the first-mold-cavity-defining portion of the second mold part 46 and the product 62 that includes the first article 48 is retained in the second-mold-cavity-defining portion of the second mold part 46, as shown in FIG. 6B.

At the beginning of a third open-mold period after the third closed-mold interval, as shown in FIG. 6B, the robot arm 20 is again moved to the predetermined depth of penetration into the space between the separated first and second mold parts 44, 46 to move the second article 52 attached to the third attachment mechanism 26 to the second mold-cavity position 42'; to move the fourth article 64 attached to the first attachment mechanism 22 to the first mold-cavity position 40'; to move the second attachment mechanism 24 to the first mold-cavity position 40'; and to move the fourth attachment mechanism 28 to the second mold cavity position 42'. All of such movements are simultaneous.

Next, the fourth attachment mechanism 28 is extended to attach onto the product 62 that includes the first article 48; the third attachment mechanism 26 is extended to place the attached second article 52 and the second component 54 combined therewith in the portion of the first mold part 44 that partially defines the second mold cavity 42; the second attachment mechanism 24 is extended to attach onto the third article 56; and the first attachment mechanism 22 is extended to place the attached fourth article 64 in the portion of the first mold part 44 that partially defines the first mold cavity 40, as shown in FIG. 6C.

Next, the fourth attachment mechanism 28 is retracted to withdraw the attached product 62 that includes the first article 48 from the second mold part 46; the third attachment mechanism 26 releases the second article 52 and the second component 54 combined therewith, which remain in the portion of the first mold part 44 that partially defines the second mold cavity 42 while the third attachment mechanism 26 is retracted; and the second attachment mechanism 24 is retracted to withdraw the attached third article 56 and the second component 58 combined therewith from the second mold part 46; and the first attachment mechanism 22 releases the fourth article 64, which remains in the portion of the first mold part 44 that partially defines the first mold cavity 40 while the first attachment mechanism 22 is retracted, as shown in FIG. 6D.

The robot arm 20 is then moved from the space between the separated first and second mold parts 44, 46 to simultaneously move both the attached product 62 that includes the first article 48, from the second position 42' and the attached third article 56 having the second component 58 combined therewith from the first position 40' to outside of the space between the separated first and second mold parts 44, 46, as shown in FIG. 6E.

The mold is then closed, as shown in FIG. 6F, to commence a fourth closed-mold interval of inaccessibility; whereupon the fourth attachment mechanism 28 releases the product 62 and then the robot arm 20 is rotated 180 degrees so that the third article 56 attached to the second attachment mechanism 24 assumes the position shown in FIG. 7A.

During the fourth closed-mold interval, as further shown in FIG. 7A, a second component 66 of a further product of which the fourth article 64 is the first component, is formed in the first mold cavity 40 by injection molding; and a third component 67 of the second product 68, of which the second article 52 is the first component, is formed in the second mold cavity 42 by injection molding. After, the injection-molded third component 67 of the second product 68 that includes the second article 52 and the second component 67 of the product that includes the fourth article 64 have cooled sufficiently, the first and second mold parts 44, 46 are separated to open the mold. When the first and second mold parts 44, 46 are separated, the second component 66 that is combined with the fourth article 64 is retained in the first-mold-cavity-defining portion of the second mold part 46 and the second product 68 that includes the second article 52 is retained in the second-mold-cavity-defining portion of the second mold part 46, as shown in FIG. 7B.

At the beginning of a fourth open-mold period after the fourth closed-mold interval, as shown in FIG. 7B, the robot arm 20 is again moved to the predetermined depth of penetration into the space between the separated first and second mold parts 44, 46 to move the third article 56 attached to the second attachment mechanism 24 to the second mold-cavity position 42'; to move the third attachment mechanism 26 to the first mold-cavity position 40'; and to move the first attachment mechanism 22 to the second mold cavity position 42'. All of such movements are simultaneous.

Next, the first attachment mechanism 22 is extended to attach onto the second product 68 that includes the second article 52; the second attachment mechanism 24 is extended to place the attached third article 56 and the second component 58 combined therewith in the portion of the first mold part 44 that partially defines the second mold cavity 42; and the third attachment mechanism 26 is extended to attach onto the fourth article 56, as shown in FIG. 7C.

Next, the first attachment mechanism 22 is retracted to withdraw the attached second product 68 that includes the second article 52 from the second mold part 46; the second attachment mechanism 24 releases the attached third article 56 and the second component 58 combined therewith, which remain in the portion of the first mold part 44 that partially defines the second mold cavity 42 while the second attachment mechanism 24 is retracted; the third attachment mechanism 26 is retracted to withdraw the attached fourth article 64 and the second component 66 combined therewith from the second mold part 16, as shown in FIG. 7D.

The robot arm 20 is then moved from the space between the separated first and second mold parts 44, 46 to simultaneously move both the attached second product 68 that includes the second article 52 from the second position 42' and the attached fourth article 64 having the second component 66 combined therewith from the first position 40' to outside of the space between the separated first and second mold parts 44, 46, as shown in FIG. 7E.

The mold is then closed, as shown in FIG. 7F, to commence a fifth closed-mold interval of inaccessibility; whereupon the first attachment mechanism 22 releases the second product 68 and then the robot arm 20 is rotated 180 degrees so that the fourth article 64 attached to the third attachment mechanism 26 is reoriented for movement to the second mold-cavity position 42' within the space between the separated mold parts 44, 46 during a fifth period of accessibility following the fifth interval of inaccessibility. During the fifth period (not shown) the third article 56 is repositioned in the same manner as the first article 48 is repositioned during the third period, and the fourth article 64 is repositioned in the same manner as the second article 52 is repositioned during the third period.

Referring to FIGS. 8A through 8F, 9A through 9F, 10A through 10F, 11A through 11F and 12A through 12F, a third embodiment of the repositioning method of the present invention is performed during an injection molding process in which a multi-component product is produced by injection molding a first component of the product in a first mold cavity 70, repositioning the first component to a second mold cavity 72 in which a second component of the product is formed in combination with the first component by injection molding, and repositioning the combined first and second components to a third mold cavity 73 in which a third component of the product is formed in combination with the combined first and the second components by injection molding. The first component of the product is referred to the following description of this third embodiment as an "article".

The first mold cavity 70, the second mold cavity 72 and the third mold cavity 73 are defined between a first mold part 74 and a second mold part 76 during closed-mold intervals of inaccessibility for repositioning of the articles while the mold is closed, as shown in views A and F of FIGS. 8, 9, 10, 11 and 12. A space between the first and second mold parts 74, 76 for repositioning of the articles is accessible only during open-mold periods while the mold is opened by separation of the first and second mold parts 74, 76, as shown in views B through E of FIGS. 8, 9, 10, 11 and 12.

A common robot arm 78 having first, second, third, fourth, fifth and sixth extendable attachment mechanisms 79, 80, 81, 82, 83 and 84 is used to reposition the articles at a first mold-cavity position 70' adjacent those portions of the separated first and second mold parts 74, 76 that define the first mold cavity 70 when the mold is closed, at a second mold-cavity position 72' adjacent those portions of the separated first and second mold parts 74, 76 that define the second mold cavity 72 when the mold is closed and at a third mold-cavity position 73' adjacent those portions of the separated first and second mold parts 74, 76 that define the third mold cavity 73 when the mold is closed. Referring to FIGS. 13A through 13D, the second and fourth attachment mechanisms 80, 82 are mounted on a first member 86 that is rotatable for interchanging the relative positions of the second and fourth attachment mechanisms 80, 82 on the robot arm 78 and the third and fifth attachment mechanisms 81, 83 are mounted on a second member 87 that is rotatable for interchanging the positions of the third and fifth attachment mechanisms 81, 83 on the robot arm 78, as shown in FIG. 13C. Also, the robot arm 78 is rotatable, as shown in FIG. 13D, for inversely interchanging the positions of the attachment mechanisms 79, 81, 83 on one side of the robot arm 78 with the positions of the attachment mechanisms 80, 82, 84 on the other side of the robot arm 78.

During a first closed-mold interval of inaccessibility, as shown in FIG. 8A, a first article 90 is formed in the first mold cavity 70 by injection molding. After the injection-molded first article 90 has cooled sufficiently, the first and second mold parts 74, 76 are separated to open the mold. When the first and second mold parts 74, 76 are separated, the first article 90 is retained in the first-mold-cavity-defining portion of the second mold part 76, as shown in FIG. 8B.

At the beginning of a first open-mold period after the first closed-mold interval, as shown in FIG. 8B, the common robot arm 78 is moved from outside of the space between the separated first and second mold parts 74, 76 to a predetermined depth of penetration into the space between the mold parts 74, 76 where the first and second attachment mechanisms 79, 80 are disposed at the first mold-cavity position 70', the third and fourth attachment mechanism 81, 82 are disposed at the second mold-cavity position 72' and the fifth and sixth attachment mechanisms 83, 84 are disposed at the third mold-cavity position 73'.

After the robot arm 78 is moved to the predetermined depth of penetration into the space between the separated first and second mold parts 74, 76, the second attachment mechanism 80 is extended to attach onto the first article 90, as shown in FIG. 8C.

The second attachment mechanism 80 is then retracted to withdraw the attached first article 90 from the second mold part 76, as shown in FIG. 8D.

The robot arm 78 is then moved from the space between the separated first and second mold parts 74, 76 to move the attached first article 90 from the first position 70' to outside of the space between the separated first and second mold parts 74, 76, as shown in FIG. 8E.

The mold is then closed, as shown in FIG. 8F, to commence a second closed-mold interval of inaccessibility; whereupon the first member 86 is rotated 180 degrees and the robot arm 78 is rotated 180 degrees so that the first article 90 attached to the second attachment mechanism 80 mounted on the first member 86 of the robot arm 78 assumes the position shown in FIG. 9A.

During the second closed-mold interval, as further shown in FIG. 9A, a second article 91 is formed in the first mold cavity 70 by injection molding. After, the injection-molded second article 91 has cooled sufficiently, the first and second mold parts 74, 76 are separated to open the mold. When the first and second mold parts 74, 76 are separated the second article 91 is retained in the first-mold-cavity-defining portion of the second mold part 76, as shown in FIG. 9B.

At the beginning of a second open-mold period after the second closed-mold interval, as shown in FIG. 9B, the robot arm 78 is again moved to the predetermined depth of penetration into the s pace between the separated first and second mold parts 74, 76 to move the first article 90 attached to the second attachment mechanism 80 to the second mold-cavity position 72' and to move the fifth attachment mechanism 83 to the first mold-cavity position 70'. All of such movements are simultaneous.

Next, the second attachment mechanism 80 is extended to place the first article 90 in the portion of the first mold part 74 that partially defines the second mold cavity 72; and the fifth attachment mechanism 83 is extended to attach onto the second article 911, as shown in FIG. 9C.

Next, the second attachment mechanism 80 releases the first article 90, which remains in the portion of the first mold part 74 that partially defines the second mold cavity 72 while the second attachment mechanism 80 is retracted; and the fifth attachment mechanism 83 is retracted to withdraw the attached second article 91 from the second mold part 76, as shown in FIG. 9D.

The robot arm 78 is then moved from the space between the separated first and second mold parts 74, 76 to move the attached second article 91 from the first position 70' to outside of the space between the separated first and second mold parts 74, 76, as shown in FIG. 9E.

The mold is then closed, as shown in FIG. 9F, to commence a third closed-mold interval of inaccessibility; whereupon the second member 87 is rotated 180 degrees and the robot arm 78 is rotated 180 degrees so that the second article 91 attached to the fifth attachment mechanism 83 mounted on the second member 87 of the robot arm 78 assumes the position shown in FIG. 10A.

Referring to FIGS. 9B through 9E, the robot arm 78 moves with one continuous movement from outside of the space between the separated first and second mold parts 74, 76 to the predetermined depth of penetration in such space where the common robot arm 78 both releases the first article 90 at the second mold-cavity position 72' and attaches onto the second article 91 at the first mold cavity position 70'; and from the predetermined depth of penetration the common robot arm 78 moves with one continuous movement to outside of such space.

In an embodiment alternative to that shown in FIGS. 9B through 9E, the attachment mechanisms 79, 80, 81, 82, 83, 84 are not extended from the robot arm 78 in order to attach onto an article or in order to place an article in a cavity-defining portion of a mold part while the robot arm remains in a stationary lateral position, as described above, but instead the robot arm 78 is moved laterally toward and away from the respective separated first and second mold parts 74, 76 in order to enable the respective attachment mechanisms 79, 80, 81, 82, 83, 84 to attach onto an article or to place an article in a cavity-defining portion of a mold part.

During the third closed-mold interval, as further shown in FIG. 10A, a third article 92 is formed in the first mold cavity 70 by injection molding; and the first article 90 is combined with a second component 93 of a product by forming the second component 93 in the second mold cavity 72 by injection molding. The first article 90, the second article 91 and the third article 92 are identical. After, the injection-molded third article 92 and the injection molded second component 93 of the product have cooled sufficiently, the first and second mold parts 74, 76 are separated to open the mold. When the first and second mold parts 74, 76 are separated the third article 92 is retained in the first-mold-cavity-defining portion of the second mold part 76 and the first article 90 and the second component 93 combined therewith are retained in the second-mold-cavity-defining portion of the second mold part 76, as shown in FIG. 10B.

At the beginning of a third open-mold period after the third closed-mold interval, as shown in FIG. 10B, the robot arm 78 is again moved to the predetermined depth of penetration into the space between the separated first and second mold parts 74, 76 to move the second article 91 attached to the fifth attachment mechanism 83 to the second mold-cavity position 72', to move the second attachment mechanism 80 to the second mold-cavity position 72' and to move the fourth attachment mechanism 82 to the first mold cavity position 70'. All of such movements are simultaneous.

Next, the second attachment mechanism 80 is extended to attach onto the first article 90 and the second component 93 combined therewith; the fifth attachment mechanism 83 is extended to place the second article 91 in the portion of the first mold part 74 that partially defines the second mold cavity 72; and the fourth attachment mechanism 82 is extended to attach onto the third article 92, as shown in FIG. 10C.

Next, the second attachment mechanism 80 is retracted to withdraw the attached first article 90 and the second component 93 combined therewith from the second mold part 76; the fifth attachment mechanism 83 releases the second article 91, which remains in the portion of the first mold part 74 that partially defines the second mold cavity 72 while the fifth attachment mechanism 83 is retracted; and the fourth attachment mechanism 82 is retracted to withdraw the attached third article 92 from the second mold part 76, as shown in FIG. 10D.

The robot arm 78 is then moved from the space between the separated first and second mold parts 74, 76 to simultaneously move both the attached first article 90 and the second component 93 combined therewith from the second position 72' and the attached third article 92 from the first position 70' to outside of the space between the separated first and second mold parts 74, 76, as shown in FIG. 10E.

The mold is then closed, as shown in FIG. 10F, to commence a fourth closed-mold interval of inaccessibility; whereupon the first member 86 is rotated 180 degrees and the robot arm 78 is rotated 180 degrees so that the combination of the first article 90 and the second component 93 attached to the second attachment mechanism 80 and the third article 92 attached to the fourth attachment mechanism 82 assume the respective positions shown in FIG. 11A.

During the fourth closed-mold interval, as further shown in FIG. 11A, a fourth article 94 is formed in the first mold cavity 70 by injection molding; and the second article 91 is combined with a second component 95 of another product by forming the second component 95 in the second mold cavity 72 by injection molding. After, the injection-molded fourth article 94 and the injection molded second component 95 of the other product have cooled sufficiently, the first and second mold parts 74, 76 are separated to open the mold. When the first and second mold parts 74, 76 are separated the fourth article 94 is retained in the first-mold-cavity-defining portion of the second mold part 76 and the second article 91 and the second component 95 combined therewith are retained in the second-mold-cavity-defining portion of the second mold part 76, as shown in FIG. 11B.

At the beginning of a fourth open-mold period after the fourth closed-mold interval, as shown in FIG. 11B, the robot arm 78 is again moved to the predetermined depth of penetration into the space between the separated first and second mold parts 74, 76 to move the combination of the first article 90 and the second component 93 attached to the second attachment mechanism 80 to the third mold-cavity position 73', to move the third article 92 attached to the fourth attachment mechanism 82 to the second mold-cavity position 72', to move the fifth attachment mechanism 83 to the second mold-cavity position 72' and to move the third attachment mechanism 81 to the first mold cavity position 70'. All of such movements are simultaneous.

Next, the second attachment mechanism 80 is extended to place the first article 90 and the second component 93 combined therewith in the portion of the first mold part 74 that partially defines the third mold cavity 73; the fifth attachment mechanism 83 is extended to attach onto the second article 91 and the second component 95 combined therewith; the fourth attachment mechanism 82 is extended to place the third article 92 in the portion of the first mold part 74 that partially defines the second mold cavity 72; and the third attachment mechanism 81 is extended to attach onto the fourth article 94, as shown in FIG. 11C.

Next, the second attachment mechanism 80 releases the combination of the first article 90 and the second component 93, which remains in the portion of the first mold part 74 that partially defines the third mold cavity 73 while the second attachment mechanism 80 is retracted; the fifth attachment mechanism 83 is retracted to withdraw the attached second article 91 and the second component 95 combined therewith from the second mold part 76; the fourth attachment mechanism 82 releases the third article 92, which remains in the portion of the first mold part 74 that partially defines the second mold cavity 72 while the fourth attachment mechanism 82 is retracted; and the third attachment mechanism 81 is retracted to withdraw the attached fourth article 94 from the second mold part 76, as shown in FIG. 11D.

The robot arm 78 is then moved from the space between the separated first and second mold parts 74, 76 to simultaneously move both the attached second article 91 and the second component 95 combined therewith from the second position 72' and the attached fourth article 94 from the first position 70' to outside of the space between the separated first and second mold parts 74, 76, as shown in FIG. 11E.

The mold is then closed, as shown in FIG. 11F, to commence a fifth closed-mold interval of inaccessibility; whereupon the second member 87 is rotated 180 degrees and the robot arm 78 is rotated 180 degrees so that the combination of the second article 91 and the second component 95 attached to the fifth attachment mechanism 83 and the fourth article 94 attached to the third attachment mechanism 81 assume the respective positions shown in FIG. 12A.

During the fifth closed-mold interval, as further shown in FIG. 12A, a fifth article 96 is formed in the first mold cavity 70 by injection molding; the combination of the first article 90 and the second component 93 is combined with a third component 97 of the product 98 by forming the third component 97 in the third mold cavity 73 by injection molding; and the third article 92 is combined with a second component 99 of still another product by forming the second component 99 in the second mold cavity 72 by injection molding. After, the injection-molded fifth article 96, the injection molded third component 97 of the product 98 and the injection molded second component 99 of the still another product have cooled sufficiently, the first and second mold parts 74, 76 are separated to open the mold. When the first and second mold parts 74, 76 are separated the fifth article 96 is retained in the first-mold-cavity-defining portion of the second mold part 76, the product 98 that includes the first article 90 is retained in the third-mold-cavity-defining portion of the second mold part 76, and the third article 92 and the second component 99 combined therewith are retained in the second-mold-cavity-defining portion of the second mold part 76, as shown in FIG. 12B.

At the beginning of a fifth open-mold period after the fifth closed-mold interval, as shown in FIG. 12B, the robot arm 78 is again moved to the predetermined depth of penetration into the space between the separated first and second mold parts 74, 76 to move the sixth attachment mechanism 84 to the third mold-cavity position 73', to move the combination of the second article 91 and the second component 95 attached to the fifth attachment mechanism 83 to the third mold-cavity position 73', to move the fourth article 94 attached to the third attachment mechanism 81 to the second mold-cavity position 72', to move the fourth attachment mechanism 82 to the second mold-cavity position 72' and to move the second attachment mechanism 80 to the first mold cavity position 70'. All of such movements are simultaneous.

Next, the sixth attachment mechanism 84 is extended to attach onto the product 98 that includes the first article 90; the fifth attachment mechanism 83 is extended to place the second article 91 and the second component 95 combined therewith in the portion of the first mold part 74 that partially defines the third mold cavity 73; the fourth attachment mechanism 82 is extended to attach onto the third article 92 and the second component 99 combined therewith; the third attachment mechanism 81 is extended to place the fourth article 94 in the portion of the first mold part 74 that partially defines the second mold cavity 72; and the second attachment mechanism 80 is extended to attach onto the fifth article 96, as shown in FIG. 12C.

Next, the sixth attachment mechanism 84 is retracted to withdraw the attached product 98 that includes the first article 90 from the second mold part 76; the fifth attachment mechanism 83 releases the combination of the second article 91 and the second component 95, which remains in the portion of the first mold part 74 that partially defines the third mold cavity 73 while the fifth attachment mechanism 83 is retracted; the fourth attachment mechanism 82 is retracted to withdraw the attached third article 92 and the second component 99 combined therewith from the second mold part 76; the third attachment mechanism 81 releases the fourth article 94, which remains in the portion of the first mold part 74 that partially defines the second mold cavity 72 while the third attachment mechanism 81 is retracted; and the second attachment mechanism 80 is retracted to withdraw the attached fifth article 96 from the second mold part 76, as shown in FIG. 11D.

The robot arm 78 is then moved from the space between the separated first and second mold parts 74, 76 to simultaneously move all three of the attached product 98 that includes the first article 90 from the third position 73', the attached third article 92 and the second component 99 combined therewith from the second position 72' and the attached filth article 96 from the first position 70' to outside of the space between the separated first and second mold parts 74, 76, as shown in FIG. 12E.

The mold is then closed, as shown in FIG. 12F, to commence a sixth closed-mold interval of inaccessibility; whereupon the sixth attachment mechanism 22 releases the product 98 that includes the first article 90 and then the first member 86 is rotated 180 degrees and the robot arm 78 is rotated 180 degrees so that the combination of the third article 92 and the second component 99 attached to the fourth attachment mechanism 82 and the fifth article 96 attached to the second attachment mechanism 80 are reoriented for movement to the third mold-cavity position 73' and the second mold-cavity position 72' respectively within the space between the separated mold parts 74, 76 during a sixth period of accessibility following the sixth interval of inaccessibility. During the sixth period (not shown) the second article 91 is repositioned in the same manner as the first article 90 is repositioned during the fifth period, the third article 92 is repositioned in the same manner as the second article 91 is repositioned during the fifth period and the fourth article 94 is repositioned in the same manner as the third article 92 is repositioned during the fifth period.

Referring to FIGS. 14A through 14L, a fourth embodiment of the repositioning method of the present invention is performed during an injection molding process in which articles that constitute components of products are repositioned within a plurality of spaces between adjacent mold parts of a stack mold that define mold cavities when respective pairs of the mold parts are combined in the course of producing multi-component products. These spaces are accessible for such repositioning only during respective series of open-mold periods that are separated by closed-mold intervals of inaccessibility for such repositioning. The first component of the product is referred to the following description of this fourth embodiment as an "article".

A first portion of the stack mold includes a first mold part 102 paired with a second mold part 103, which when combined, as shown in FIG. 14F, define a first mold cavity 104 and a second cavity 105; and a second portion of the stack mold includes a third mold part 107 paired with a fourth mold part 108, which when combined, as shown in FIG. 14L, define a third mold cavity 109 and a fourth cavity 110. The first, second, third and fourth mold parts 102, 103, 107, 108 are respectively disposed in seriatim adjacent each other for movement along a common axis.

A first space between the first and second mold parts 102, 103 is accessible for repositioning of the articles only during a first series of open-mold periods while the first portion of the mold is opened by separation of the first and second mold parts 102, 103, as shown in views B through E of FIG. 14, with an intervening closed-mold interval of inaccessibility of the first series being shown in views F through A. A second space between the third and fourth mold parts 107, 108 is accessible for repositioning of the articles only during a second series of open-mold periods while the second portion of the mold is opened by separation of the third and fourth mold parts 107, 108, as shown in views H through K of FIG. 14, with an intervening closed-mold interval of inaccessibility of the second series being shown in views L through G. The first space is accessible only during a closed-mold interval in the second series of open-mold periods pertaining to the second space; and the second space is accessible only during a closed-mold interval in the first series of open-mold periods pertaining to the first space An article that was formed in the first mold cavity 104 by injection molding at the beginning of a closed-mold interval of accessibility of the first series, as shown in FIG. 14G, is repositioned to the fourth mold cavity 110, where the article is combined with a second component of one product by injection molding the second component in the fourth mold cavity 110, as shown in FIG. 14A. Another article that was formed in the third mold cavity 109 by injection molding at the beginning of a closed-mold interval of accessibility of the second series, as shown in FIG. 14A, is repositioned to the second mold cavity 105, where the other article is combined with a second component of another product by injection molding the second component in the second mold cavity 105, as shown in FIG. 14G.

The articles are repositioned between the respective mold cavities 104 and 110, 109 and 105 by means of a common robot arm 112, which includes first, second, third and fourth extendable attachment mechanism 113, 114, 115 and 116 that are so positioned on the robot arm 112 that when the robot arm 112 is moved from outside of the first space between the separated first and second mold parts 102, 103 to a predetermined depth of penetration into the first space between the first and second mold parts 102, 103, as shown in FIG. 14B, the first and second attachment mechanisms 113, 114 are disposed at a first mold-cavity position 104' respectively adjacent those portions of the separated first and second mold parts 102, 103 that define the first mold cavity 104 when the first portion of the mold is closed, and the third and fourth attachment mechanisms 115, 116 are disposed at a second mold-cavity position 105' respectively adjacent those portions of the separated first and second mold parts 102, 103 that define the second mold cavity 105 when the first portion of the mold is closed. The positioning of the attachment mechanisms 113, 114, 115, 116 on the robot arm 112 is also such that when the robot arm 112 is moved from outside of the second space between the separated third and fourth mold parts 107, 108 to a predetermined depth of penetration into the second space between the third and fourth mold parts 107, 108, as shown in FIG. 14H, the third and fourth attachment mechanisms 115, 116 are disposed at a third mold-cavity position 109' respectively adjacent those portions of the separated third and fourth mold parts 107, 108 that define the third mold cavity 109 when the second portion of the mold is closed, and the first and second attachment mechanisms 113, 114 are disposed at a fourth mold-cavity position 110' respectively adjacent those portions of the separated third and fourth mold parts 107, 108 that define the fourth mold cavity 110 when the second portion of the mold is closed.

In accordance with this fourth embodiment of the repositioning method, a first article 118 is moved from the first mold-cavity position 104' within the first space to outside of both the first space and the second space during an open-mold period of the first series of open-mold periods when the first space between the first pair of the first and second mold parts 102, 103 is accessible, while the second space between the second pair of the third and fourth mold parts 107, 108 is inaccessible for repositioning; and the first article 118 subsequently is moved from outside of the first space and the second space to the fourth mold-cavity position 110' within the second space during an open-mold period of the second series when the second space between the second pair of the third and fourth mold parts 107, 108 is accessible, while the first space between the first pair of the first and second mold parts 102, 103 is inaccessible for repositioning. A more detailed description of the fourth embodiment follows:

At the beginning of an open-mold period of the first series after a closed-mold interval thereof, as shown in FIG. 14B, the first and second mold parts 102, 103 are separated, whereupon a first article 118 formed in the first mold cavity 104 during the preceding closed-mold interval of the first series is retained in the first-mold-cavity-defining portion of the second mold part 103 and a product 120 that includes a second article 122 combined with a second component 124 formed in the second mold cavity 105 during the preceding closed-mold interval of the first series is retained in the second-mold-cavity-defining portion of the second mold part 103; and the common robot arm 112 is moved to the predetermined depth of penetration into the first space between the separated first and second mold parts 102, 103 in order to dispose the second attachment mechanism 114 of the robot arm 112 at the first mold-cavity position 104' and in order to dispose the fourth attachment mechanism 116 at the second mold-cavity position 105'. In this embodiment the first article 118 and the second article 122 are identical.

Next, the second attachment mechanism 114 is extended to attach onto the first article 118 and the fourth attachment mechanism 116 is extended to attach onto the product 120 that includes the second article 122, as shown in FIG. 14C.

Next, the second attachment mechanism 114 is retracted to withdraw the attached first article 118 from the second mold part 103 and the fourth attachment mechanism 116 is retracted to withdraw the attached product 120 that includes the second article 122 from the second mold part 103, as shown in FIG. 14D.

The robot arm 112 is then moved from the first space between the separated first and second mold parts 102, 103 to simultaneously move both the attached first article 118 from the first position 104' and the attached product 120 that includes the second article 122 from the second position 105' to outside of the first space between the separated first and second mold parts 102, 103, as shown in FIG. 14E.

The first portion of the mold is then closed, as shown in FIG. 14F, to commence a another closed-mold interval of inaccessibility of the first series; whereupon the fourth attachment mechanism 116 releases the product 120 that includes the second article 122 and then the robot arm 118 is rotated 180 degrees so that the first article 118 attached to the second attachment mechanism 114 of the robot arm 112 assumes the position shown in FIG. 14G.

At the beginning of a subsequent open-mold period of the second series, as shown in FIG. 14G, the third and fourth mold parts 107, 108 are separated, whereupon a third article 126 formed in the third mold cavity 109 during the preceding closed-mold interval of the second series is retained in the third-mold-cavity-defining portion of the third mold part 107 and a product 128 that includes a fourth article 130 combined with a second component 132 formed in the fourth mold cavity 110 during the preceding closed-mold interval of the second series is retained in the fourth-mold-cavity-defining portion of the third mold part 107; and the common robot arm 112 is moved to the predetermined depth of penetration into the second space between the separated third and fourth mold parts 107, 108 in order to move the first article 118 attached to the second attachment mechanism 114 to the fourth mold-cavity position 110', in order to dispose the third attachment mechanism 115 at the third mold-cavity position 109' and in order to dispose the first attachment mechanism 113 at the fourth mold-cavity position 110'. The third article 126 and the fourth article 130 are identical to the first article 118 and the second article 120.

Next, the second attachment mechanism 114 is extended to place the first article 118 in the portion of the fourth mold part 108 that partially defines the fourth mold cavity 110; the third attachment mechanism 115 is extended to attach onto the third article 126 and the first attachment mechanism 113 is extended to attach onto the product 128 that includes the fourth article 130, as shown in FIG. 14I.

Next, the second attachment mechanism 114 releases the first article 118, which remains in the portion of the fourth mold part 108 that partially defines the fourth mold cavity 110 while the second attachment mechanism 114 is retracted; the third attachment mechanism 115 is retracted to withdraw the attached third article 126 from the third mold part 107 and the first attachment mechanism 113 is retracted to withdraw the attached product 128 that includes the fourth article 130 from the third mold part 107, as shown in FIG. 14J.

The robot arm 112 is then moved from the second space between the separated third and forth mold parts 107, 108 to simultaneously move both the attached third article 126 from the third position 109' and the attached product 128 that includes the fourth article 130 from the fourth position 110' to outside of the second space between the separated third and fourth mold parts 107, 108, as shown in FIG. 14K.

The second portion of the mold is then closed, as shown in FIG. 14L, to commence another closed-mold interval of inaccessibility of the second series; whereupon the first attachment mechanism 113 releases the product 128 that includes the fourth article 130 and then the robot arm 112 is rotated 180 degrees so that the third article 126 attached to the third attachment mechanism 115 of the robot arm 112 assumes the position shown for article 126' in FIG. 14A. The repositioning method continues through another sequence of steps such as shown in FIGS. 14A through 14L, with a product that includes the first article 118 being moved from the fourth mold cavity position 110' to outside of the second space during the next open-mold period of the second series by a step such as that shown in FIG. 14K, in which the product 128 that includes the fourth article 130 is so moved.

It is noted from FIGS. 14A through 14L that except for repositioning the articles between positions within spaces between different pairs of mold parts, the fourth embodiment of the repositioning method is quite similar to the first embodiment of repositioning method shown in FIGS 1A through 1F, FIGS. 2A through 2F and FIGS. 3A through 3F, wherein during an open-mold period (a) two different articles are moved simultaneously by a common robot arm from different mold cavity positions within a space between separated mold parts to outside of such space; and (b) one article is moved from outside of such space to a given mold-cavity position within such space by means of a common robot arm that is also used to move another article from the same mold-cavity position to outside of such space. The other features of the first embodiment described hereinabove that are not incompatible with the fourth embodiment are also included in the fourth embodiment.

Utilization of the fourth embodiment of the repositioning method of the present invention with a desynchronously opened stack mold, as described above, enables articles to be repositioned more quickly in that one article can be repositioned into a space in a different portion of the mold than the portion from which the one article was moved while another article that was subsequently injection-molded in the portion of the stack mold from which the one article was moved is cooling.

All of the embodiments of the repositioning method of the present invention described herein can be practiced with the desynchronously opened stack mold described in U.S. Pat. No. 4,990,299 to Jens Ole Sorensen.

The design and operations of the robot arms are not limited to the particular embodiments described herein, inasmuch as the art includes many different types of robot arm designs and operations that can provide the same results as attained by the embodiments of the robot arms described herein.

The respective components of the multi-component products may be made of different plastic materials and/or of different colors. There is no upper limitation as to the number of components; and the relative positioning of the different mold cavities may be other than the linear alignments shown in the Drawing.

During the injection-molding processes in which the repositioning methods of the present invention are utilized, additional products can also be injection molded between the same pair(s) of mold parts as are used to form multi-component products through utilization of the repositioning methods. Such additional products may be either single component products or multi-component products; and such additional multi-component products may include a plurality of identical and/or dissimilar products of which one or more components are repositioned in accordance with the present invention.

The repositioning methods of the present invention can be utilized with injection-molding processes other than those described herein. For example the repositioning methods of the present invention can be utilized with a core-back injection molding process, in which a core is retracted following injection of a first plastic material into a mold cavity in order to enable injection of a second plastic material into the mold cavity without separating the mold parts between such injections of the plastic material, such that at least one of the components of the multi-component product formed through utilization of the repositioning method may be multi-colored and/or composed of different materials. In an exemplary embodiment using a mold having two core-back mold cavities, a first component formed in the first core-back mold cavity can be a multi-colored and/or multi-material component that is removed from the space between the mold parts during a first open-mold period of accessibility; and after the first component subsequently is moved to the position of the second core-back cavity during a second open-mold period of accessibility, a second multi-colored and/or multi-material component is formed in the second core-back mold cavity during a subsequent closed-mold interval of inaccessibility, A core-back injection-molding process for a stack mold is described in U.S. Pat. No. 5,049,343 to Jens Ole Sorensen.

During an intermediate closed-mold interval during which a component of an uncompleted multi-component product is outside of the space between the mold parts as a result of being repositioned in accordance with the present invention, such component can be subjected to an ancillary process that enhances the final product. For example, a product label can be affixed to such component; and then after the component subsequently has been repositioned within the space between the mold parts a transparent plastic layer can be injection molded over the label to thereby provide a product having a sealed label. The respective components of the product can be subjected to a different ancillary processes during each such intermediate closed mold interval in which the respective component is outside the space between the mold parts during the overall injection molding process.

The repositioning methods of the present invention also may be utilized with processes other than injection molding in which certain steps are better carried out either under or apart from special conditions in a space that is sealed from the ambient, such as conditions of extreme heat or cold, high or low pressure, high pollution, poisonous air, high radiation or within a centrifuge.

For example an article that has been repositioned during a period of accessibility into a space from which the article was removed during a prior period of accessibility may be subjected to a process, such as heat processing or irradiation, that is more effective during an interval of less accessibility than during a period of accessibility.

In another example, an article that has been moved from a space to outside of the space during a period of accessibility is subjected to a given process during an interval of less accessibility while outside of the space before being moved back into the space during a subsequent period of accessibility.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

What is claimed is:

1. A method of repositioning articles within a space that is accessible for said repositioning only during a series of periods that are separated by intervals of less accessibility for said repositioning, comprising the steps of:
    (a) during a first said period, moving a first article from a first position within said space to outside of said space; and
    (b) during the first period, moving a second article from outside of said space to a second position within said space;
    wherein said movement of the first article and said movement of the second article are by means of a common vehicle.

2. A method according to claim 1, further comprising the step of:
    (c) during a second period after a said interval of inaccessibility that is subsequent to the first period, moving the first article by means of the common vehicle from outside of said space to the second position.

3. A method according to claim 2, further comprising the step of:
    (d) during the second period, moving the second article by means of the common vehicle from the second position to outside of said space.

4. A method according to claim 1, further comprising the step of:
    (c) during a second period after a said interval of inaccessibility that is subsequent to the first period, moving the second article by means of the common vehicle from the second position to outside of said space.

5. A method of repositioning articles within a space that is accessible for said repositioning only during a series of periods that are separated by intervals of less accessibility for said repositioning, comprising the steps of:
    (a) during a first said period, moving a first article from a first position within said space to outside of said space; and
    (b) during the first period, moving an identical second article from outside of said space to a second position within said space.

6. A method according to claim 5, further comprising the step of:
    (c) during a second period after a said interval of inaccessibility that is subsequent to the first period, moving the first article from outside of said space to the second position.

7. A method according to claim 5, wherein said movement of the first article and said movement of the second article are by means of a common vehicle.

8. A method of repositioning articles within a space that is accessible for said repositioning only during a series of periods that are separated by intervals of less accessibility for said repositioning than during said periods, comprising the steps of:

(a) during a first said period, moving a first article from a first position within said space to outside of said space; and (b) during a second said period after a said interval of less accessibility that is subsequent to the first period, moving the first article from outside of said space to a second position within said space.

9. A method according to claim 8, wherein said movements of the first article during steps (a) and (b) are by means of a common vehicle.

10. A method according to claim 8, further comprising the step of:

(c) during the second period, moving the first article from outside of said space to the second position.

11. A method according to claim 8, further comprising the step of:

(c) during the second period, moving a second article from the first position to outside of said space.

12. A method according to claim 11, further comprising the step of:

(d) during a third said period after a said interval of less accessibility that is subsequent to the second period, moving the second article from outside of said space to the second position.

13. A method according to claim 12, further comprising the steps of:

(e) during the third period, moving a third article from the first position to outside of said space; and (f) during a fourth said period after a said interval of less accessibility that is subsequent to the third period, moving the third article from outside of said space to the second position.

14. A method according to claim 13, wherein step (e) further comprises the step of:

(g) moving the first article from the second position to outside of said space simultaneously with said movement of the third article from the first position;

wherein said simultaneous movement of the first article and the third article is by means of a common vehicle.

15. A method according to claim 13, wherein step (f) her comprises the step of:

(g) moving the first article from outside of said space to a third position within said space simultaneously with said movement of the third article to the second position;

wherein said simultaneous movement of the first article and the third article is by means of a common vehicle.

16. A method according to claim 15, further comprising the following step during a fifth said period after a said interval of less accessibility that is subsequent to the fourth period:

(h) moving the first article, the third article and a fifth article out of said space simultaneously by means of a common vehicle.

17. A method according to claim 13, further comprising the following step during the fourth period:

(g) moving the second article and a fourth article out of said space simultaneously by means of a common vehicle.

18. A method according to claim 17, further comprising the following step during a fifth said period after a said interval of less accessibility that is subsequent to the fourth period:

(h) moving the second article and the fourth article into said space simultaneously by means of a common vehicle.

19. A method according to claim 13, wherein the first article and the second article are identical articles.

20. A method according to claim 11, wherein the first article and the second article are identical articles.

21. A method according to claim 8, further comprising the steps of:

(c) during a third said period after a said interval of less accessibility that is subsequent to the second period, moving the first article from the second position to outside of said space; and (d) during a fourth said period after a said interval of less accessibility that is subsequent to the third period, moving the first article from outside of said space to a third position within said space.

22. A method according to claim 21, further comprising the steps of:

(e) during the second period, moving a second article from the first position to outside of said space; and (f) during the third period, moving the second article from outside of said space to the second position.

23. A method according to claim 21, wherein during a said interval of less accessibility that is subsequent to the second period and prior to the third period, the first article is combined with a given object.

24. A method according to claim 23, wherein during a said interval of less accessibility that is subsequent to the fourth period, the first article is further combined with another object.

25. A method according to claim 8, wherein step (b) further comprises the step of:

(c) moving another article from outside of said space to the first position simultaneously with said movement of the first article to the second position;

wherein said simultaneous movement of the first article and the other article is by means of a common vehicle.

26. A method according to claim 25, wherein the first article and the other article are identical articles.

27. A method according to claim 8, wherein step (a) further comprises the step of:

(c) moving another article from a second position within said space to outside of said space simultaneously with said movement of the first article from the first position;

wherein said simultaneous movement of the first article and the other article is by means of a common vehicle.

28. A method according to claim 27, wherein step (a) further comprises the step of:

(d) moving a further article from a third position within said space to outside of said space simultaneously with said movement of the first article from the first position;

wherein said simultaneous movement of the first article, the other article and the further article is by means of a common vehicle.

29. A method according to claim 27, wherein the first article and the other article are identical articles.

30. A method according to claim 8, wherein during a said interval of less accessibility that is subsequent to the second period, the first article is combined with a given object.

31. A method according to claim 8, wherein during a said interval of less accessibility that is subsequent to the second period, the first article is subjected to a process that is more effective during a said period of less accessibility than during a said period of accessibility.

32. A method according to claim 8, wherein during a said interval of less accessibility that is between the first period and the second period, the first article is subjected to a given process.

33. A method according to claim 8, wherein the first period is separated from the second period by only one interval of less accessibility.

34. A method of repositioning an article within a space that is accessible for the repositioning of articles therein only during a series of periods that are separated by intervals of less accessibility for said repositioning than during said periods, comprising the steps of:
   (a) during a first said period, moving an article from outside of said space to a first position within said space;
   (b) during a second period after a said interval of less accessibility that is subsequent to the first period, moving the article from the first position to outside of said space; and
   (c) during a third said period after a said interval of less accessibility that is subsequent to the second period, moving the article from outside of said space to a second position within said space.

35. A method according to claim 34, wherein during a said interval of less accessibility that is subsequent to the first period and prior to the second period, the article is combined with a given object.

36. A method according to claim 35, wherein during a said interval of less accessibility that is subsequent to the third period and prior to a fourth said period, the article is further combined with another object.

\* \* \* \* \*